United States Patent
Kabkab

(10) Patent No.: US 12,300,002 B2
(45) Date of Patent: May 13, 2025

(54) PIPELINE ARCHITECTURE FOR ROAD SIGN DETECTION AND EVALUATION

(71) Applicant: WAYMO LLC, Mountain View, CA (US)

(72) Inventor: Maya Kabkab, Palo Alto, CA (US)

(73) Assignee: WAYMO LLC, Mountain View, CA (US)

( * ) Notice: Subject to any disclaimer, the term of this patent is extended or adjusted under 35 U.S.C. 154(b) by 15 days.

(21) Appl. No.: 18/503,432

(22) Filed: Nov. 7, 2023

(65) Prior Publication Data

US 2024/0071100 A1 Feb. 29, 2024

Related U.S. Application Data

(63) Continuation of application No. 17/466,179, filed on Sep. 3, 2021, now Pat. No. 11,861,915.

(51) Int. Cl.
| | |
|---|---|
| *G06F 18/2431* | (2023.01) |
| *B60W 60/00* | (2020.01) |
| *G06V 20/58* | (2022.01) |
| *G06V 20/62* | (2022.01) |

(52) U.S. Cl.
CPC ......... *G06V 20/582* (2022.01); *B60W 60/001* (2020.02); *G06F 18/2431* (2023.01); *G06V 20/63* (2022.01); *B60W 2420/403* (2013.01); *B60W 2420/408* (2024.01);
(Continued)

(58) Field of Classification Search
None
See application file for complete search history.

(56) References Cited

U.S. PATENT DOCUMENTS

| | | |
|---|---|---|
| 6,801,638 B1 | 10/2004 | Janssen et al. |
| 6,813,545 B2 | 11/2004 | Stromme |
| 7,068,844 B1 | 6/2006 | Javidi et al. |

(Continued)

OTHER PUBLICATIONS

De la Escalera, Arturo, et al, Road Traffic Sign Detection and Classification, IEEE, Sep. 3, 1997, 12 pp.
(Continued)

*Primary Examiner* — Idowu O Osifade
(74) *Attorney, Agent, or Firm* — Botos Churchill IP Law LLP

(57) ABSTRACT

The technology provides a sign detection and classification methodology. A unified pipeline approach incorporates generic sign detection with a robust parallel classification strategy. Sensor information such as camera imagery and lidar depth, intensity and height (elevation) information are applied to a sign detector module. This enables the system to detect the presence of a sign in a vehicle's external environment. A modular classification approach is applied to the detected sign. This includes selective application of one or more trained machine learning classifiers, as well as a text and symbol detector. Annotations help to tie the classification information together and to address any conflicts with different outputs from different classifiers. Identification of where the sign is in the vehicle's surrounding environment can provide contextual details. Identified signage can be associated with other objects in the vehicle's driving environment, which can be used to aid the vehicle in autonomous driving.

21 Claims, 25 Drawing Sheets

(52) U.S. Cl.
CPC ..... *B60W 2555/60* (2020.02); *B60W 2710/20* (2013.01); *B60W 2720/106* (2013.01); *B60W 2720/125* (2013.01)

(56) References Cited

U.S. PATENT DOCUMENTS

| | | |
|---|---|---|
| 7,466,841 B2 | 12/2008 | Bahlmann et al. |
| 9,459,626 B2 | 10/2016 | Chen et al. |
| 9,697,430 B2 | 7/2017 | Kristensen |
| 10,043,109 B1 | 8/2018 | Du et al. |
| 10,928,828 B2 | 2/2021 | Xu et al. |
| 11,521,371 B2 * | 12/2022 | Omari ............... G06V 10/758 |
| 2004/0086153 A1 | 5/2004 | Tsai et al. |
| 2008/0137908 A1 | 6/2008 | Stein et al. |
| 2009/0074249 A1 | 3/2009 | Moed et al. |
| 2011/0109476 A1 | 5/2011 | Porikli et al. |
| 2011/0216202 A1 | 9/2011 | Natroshvili et al. |
| 2019/0392231 A1 | 12/2019 | Dean et al. |

OTHER PUBLICATIONS

Liu, Zhanwen, et al, Scale-aware limited deformable convolutional neural networks for traffic sign detection and classification, IET Intell. Transp. Syst., 2020, vol. 14, Iss. 12, pp. 1712-1722.

Paulo, Carlos Filipe, et al., Automatic Detection and Classification of Traffic Signs, Instituto de Telecomunicações, Jun. 2007, 5 pp.

Saadna, Yassimina, et al., An Overview of Traffic Sign Detection and Classification Methods, International Journal of Multimedia Information Retrieval, Sep. 2017, 19 pp.

The Extended European Search Report for European Patent Application No. 22191213.2, Feb. 7, 2023.

Yang, Yi, et al, Towards Real-Time Traffic Sign Detection and Classification, IEEE Transactions on Intelligent Transportation Systems, Jul. 2016, vol. 17, No. 7, pp. 2022-2031.

Zhu, Zhe, et al, Traffic-Sign Detection and Classification in the Wild, IEEE Xplore, 2016, pp. 2110-2118.

* cited by examiner

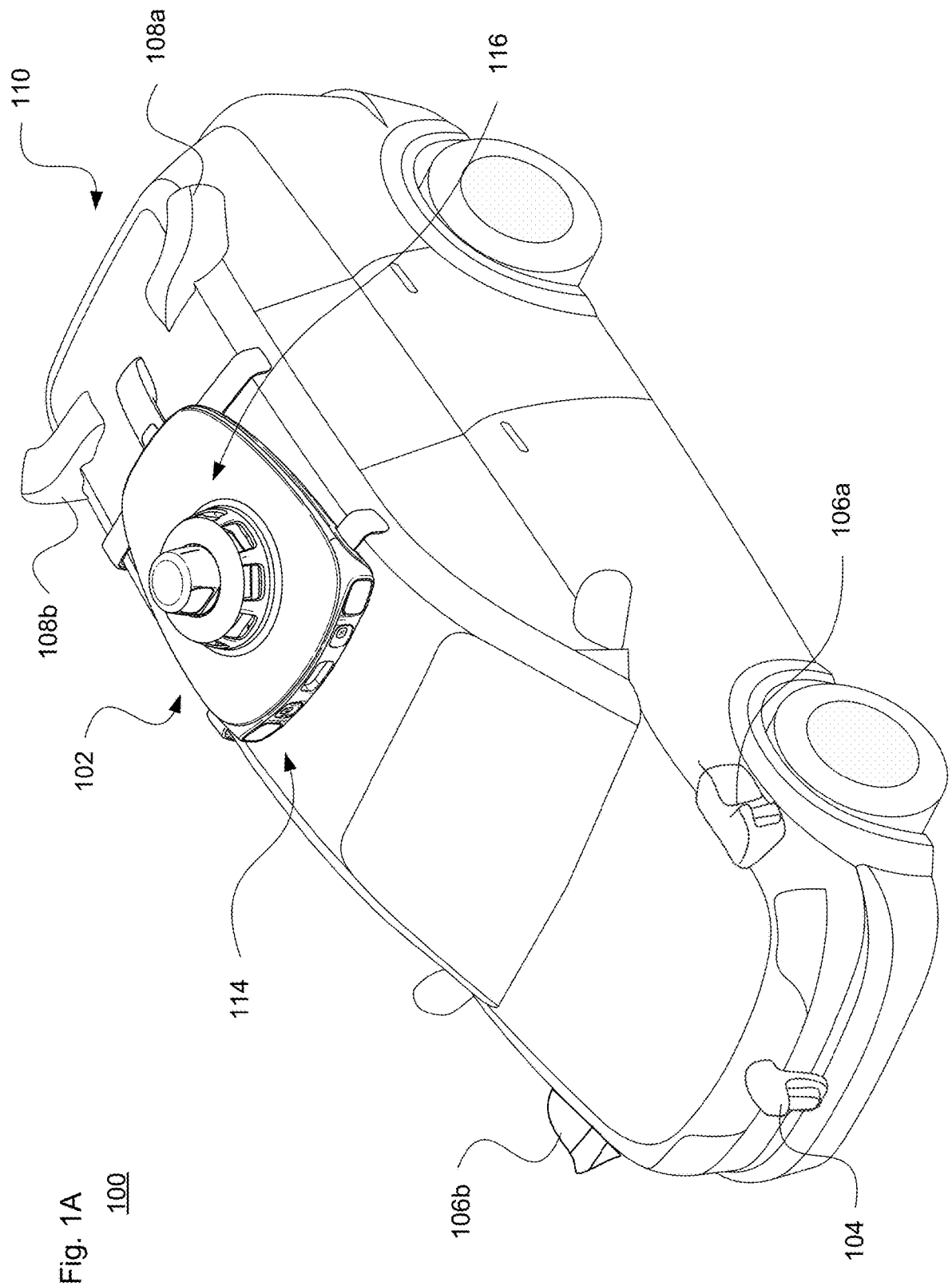

120

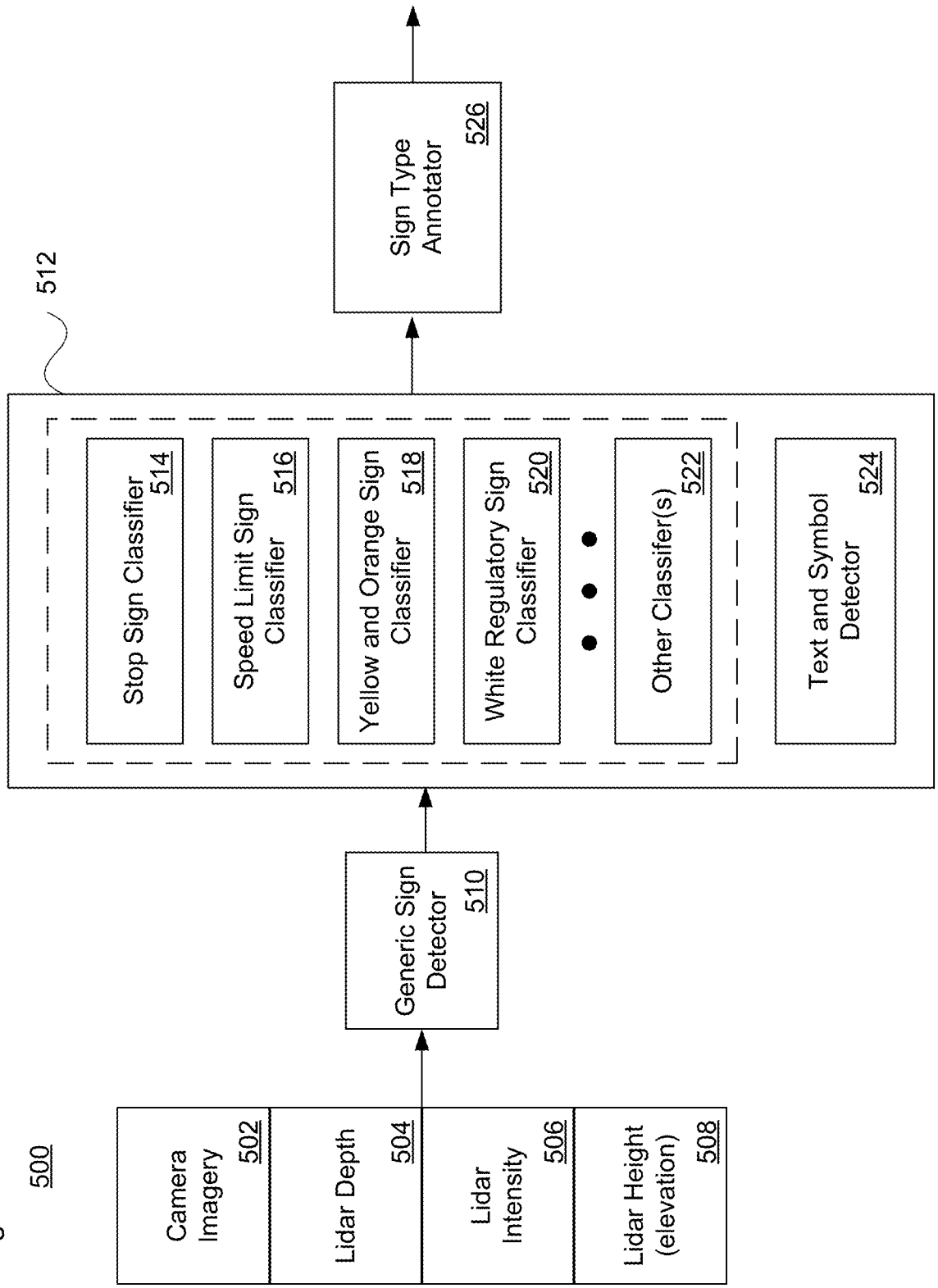

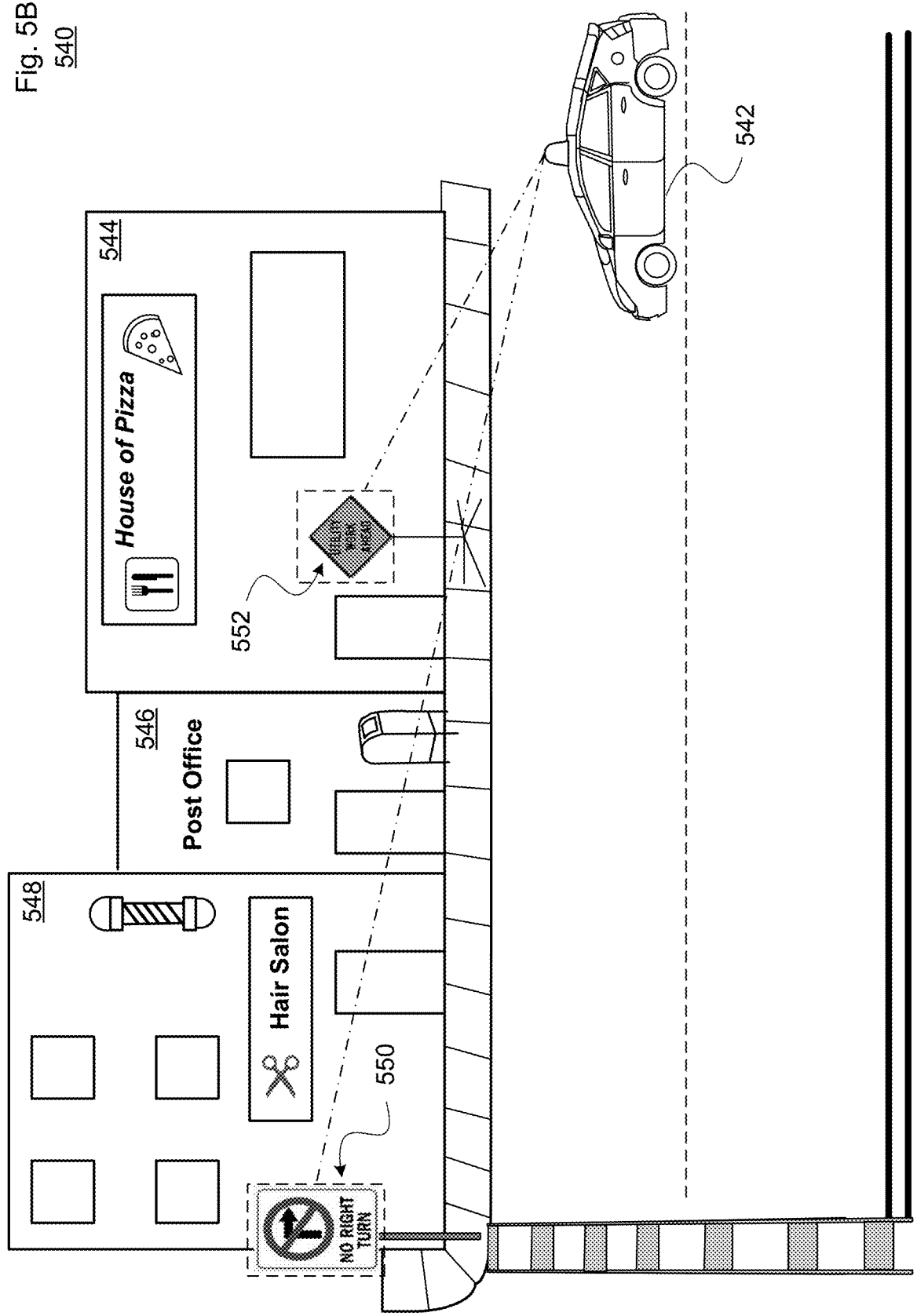

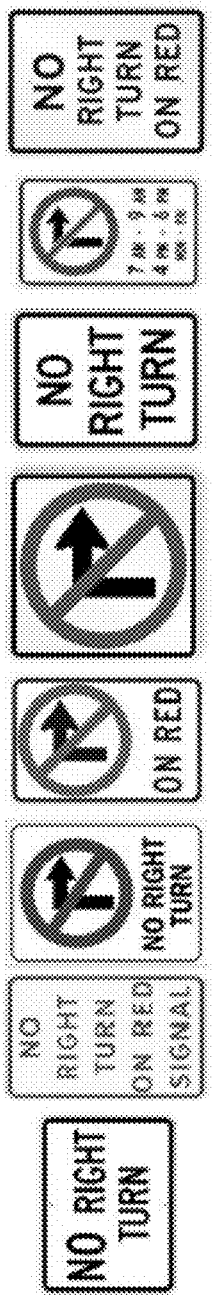
Fig. 6B
620
NO – RIGHT – TURN – RED
NO_RIGHT_SYMBOL – RED
NO – RIGHT – TURN – RED
No Right Turn on Red
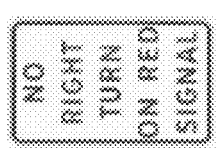  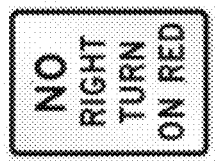

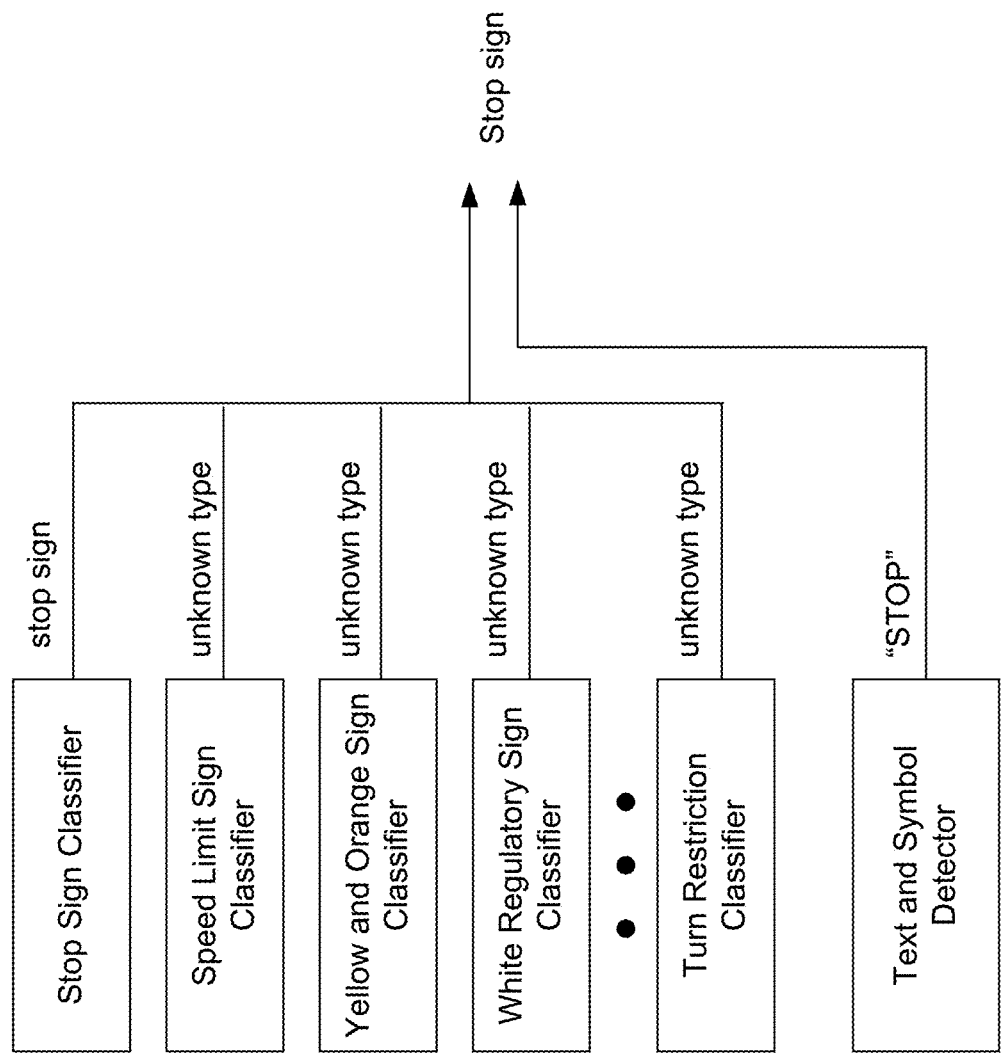
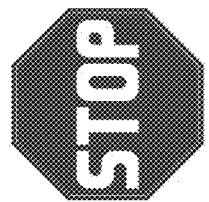
Fig. 7A
700

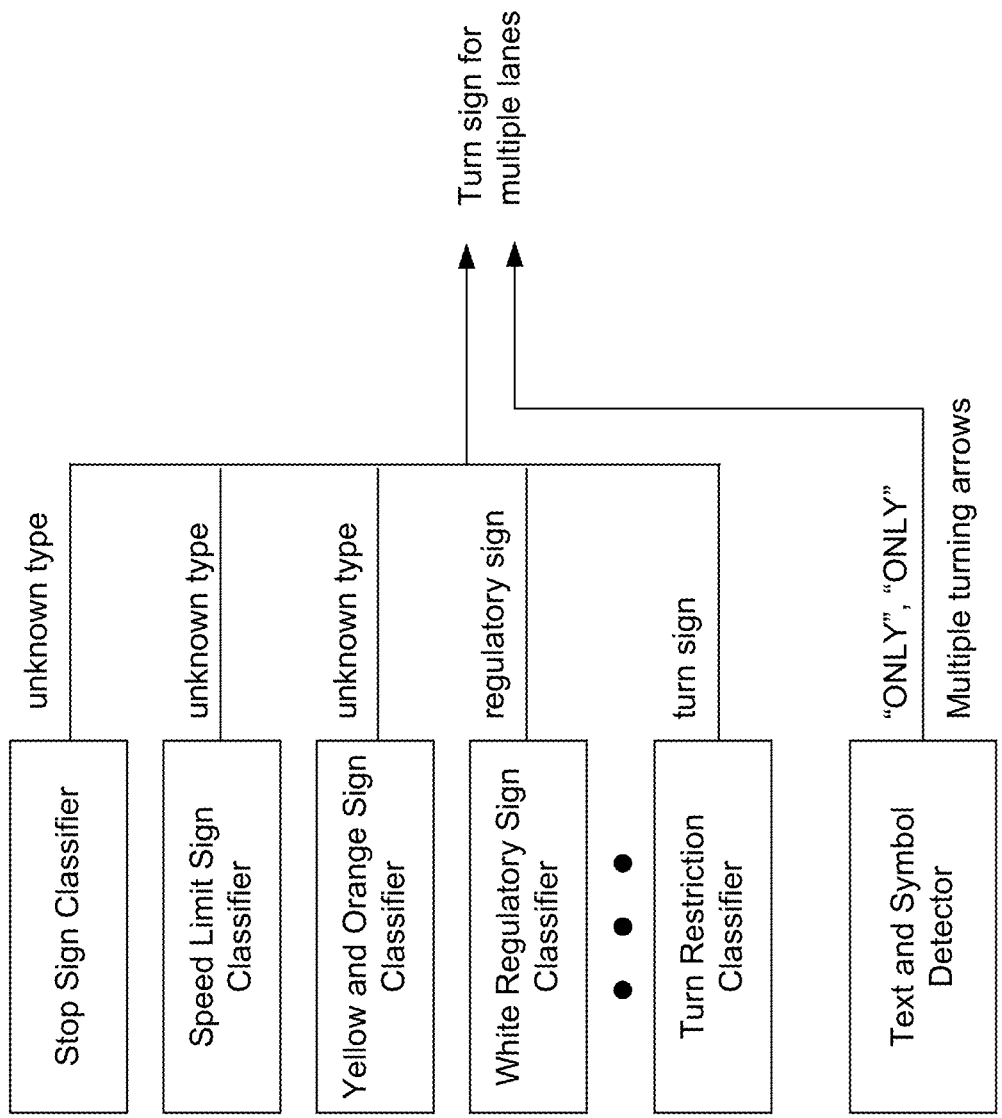
Fig. 7B
720
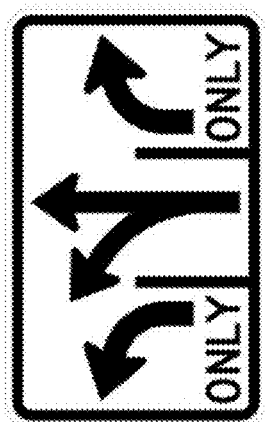

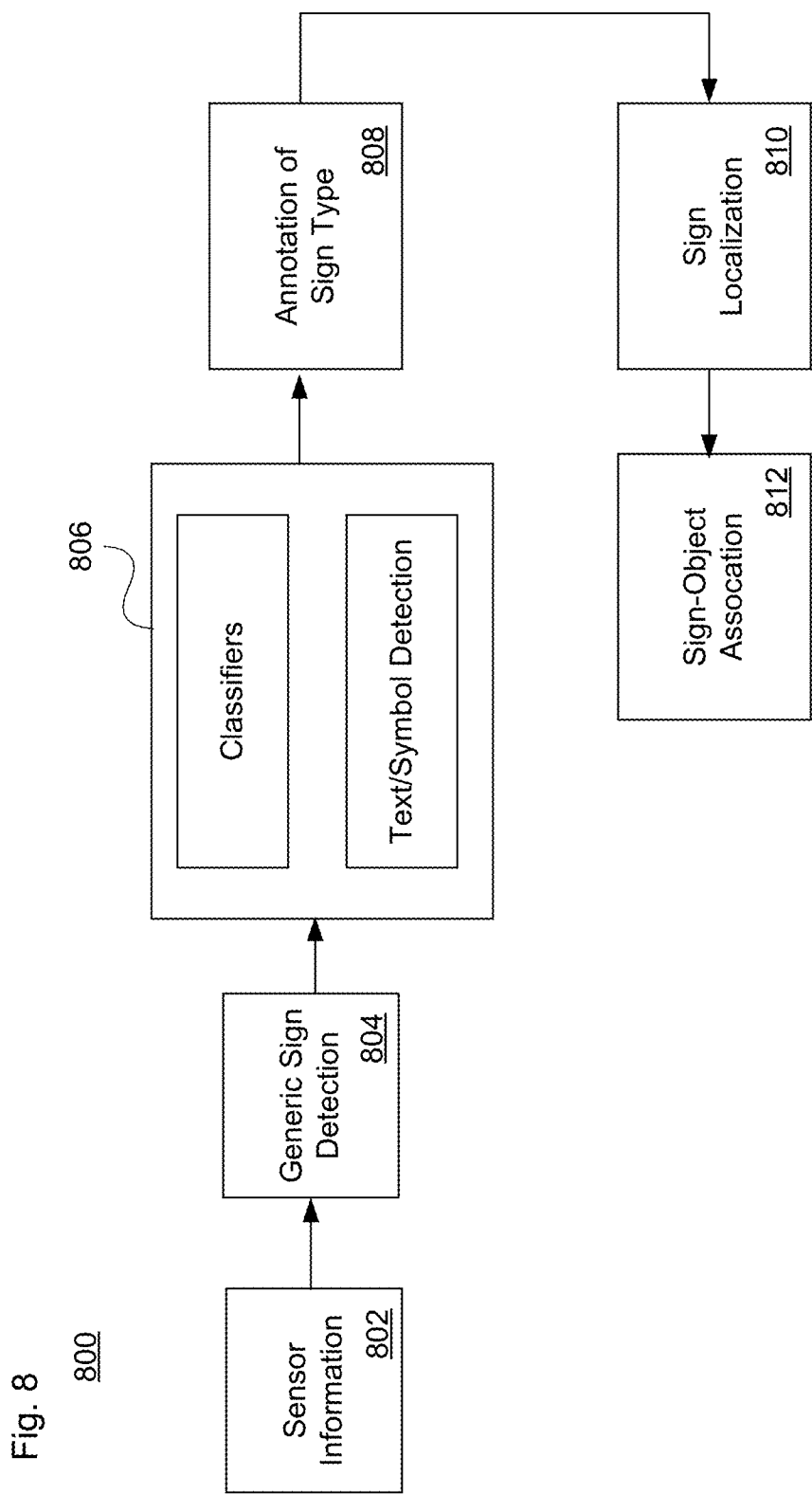

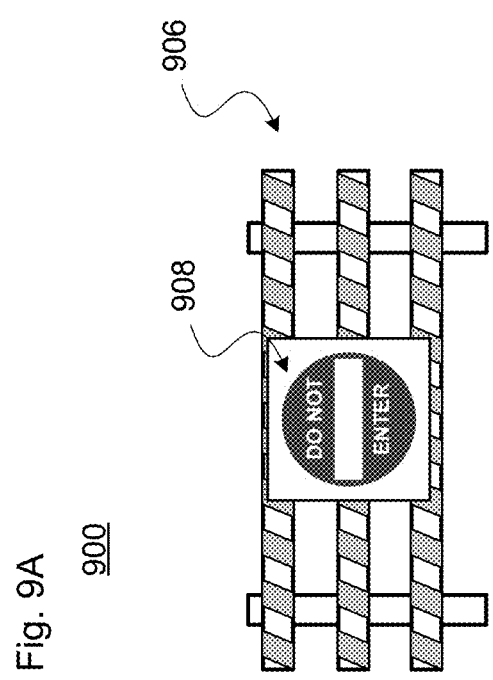
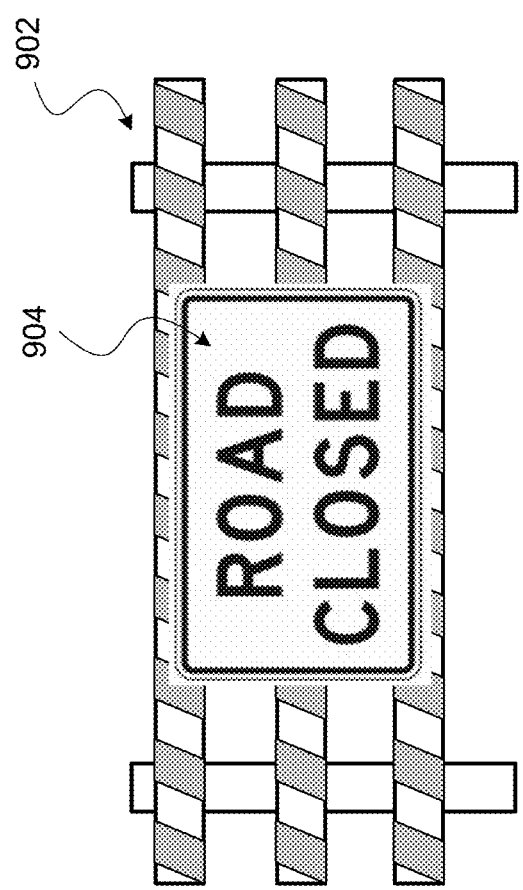
Fig. 9A

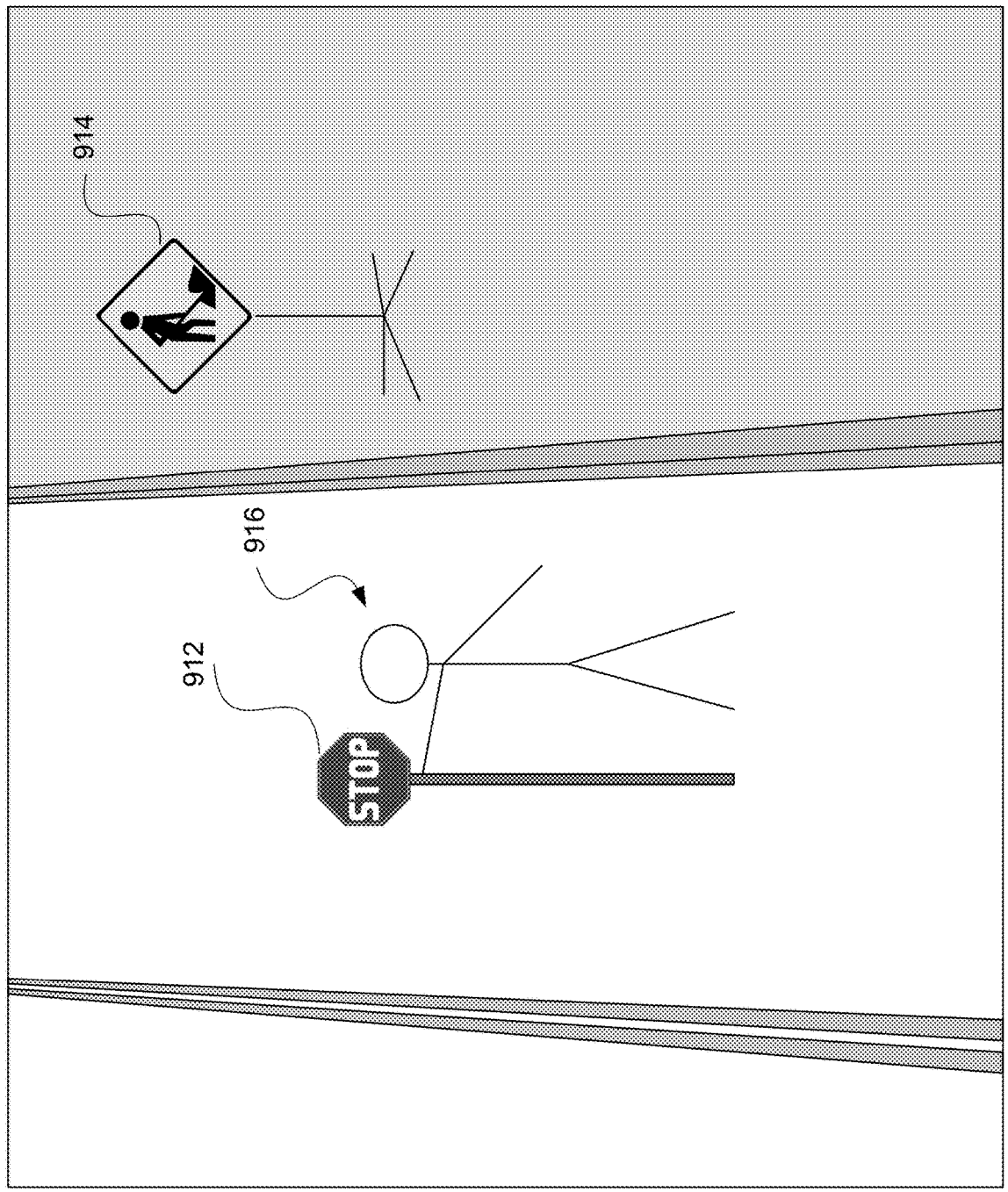

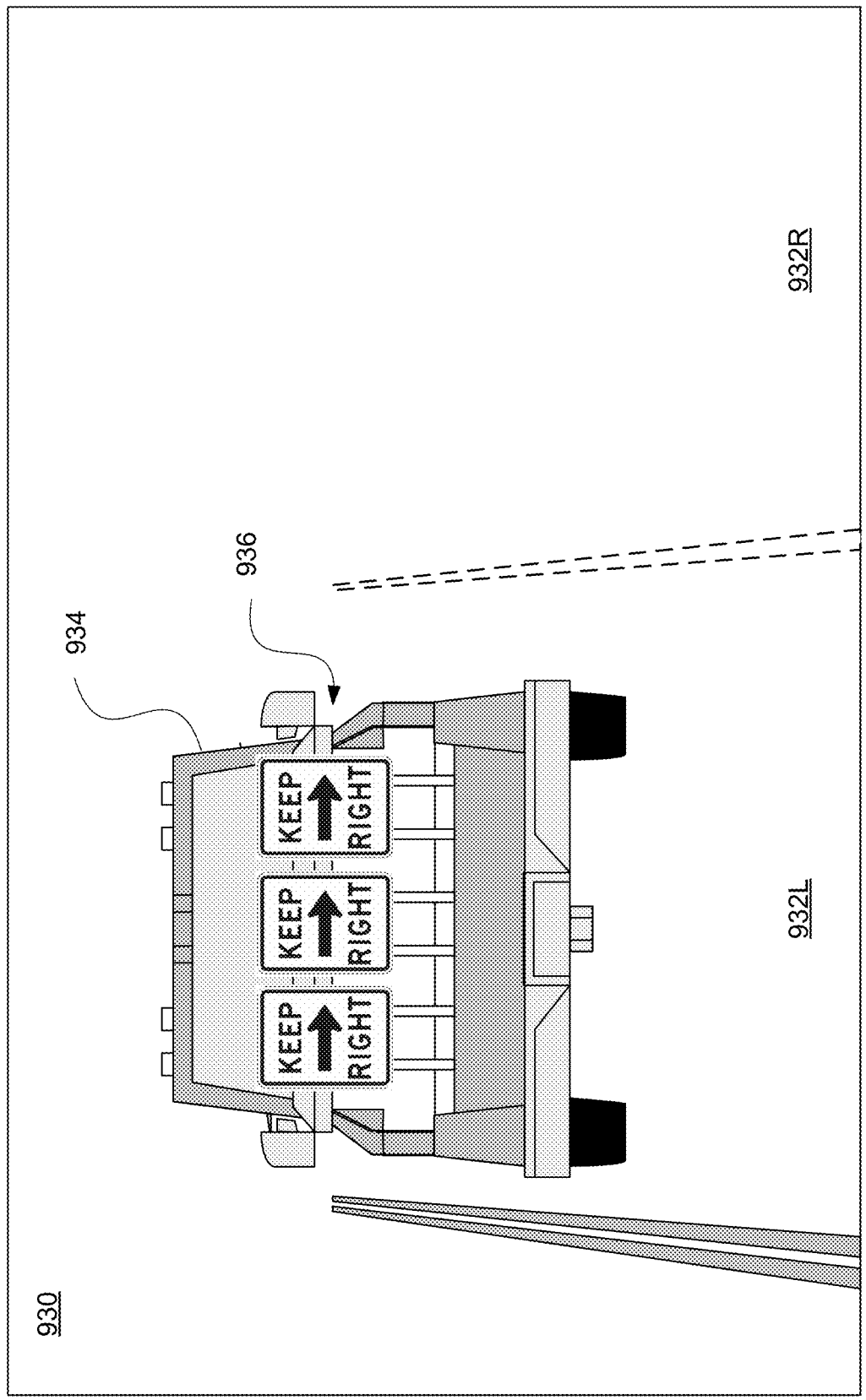

PIPELINE ARCHITECTURE FOR ROAD SIGN DETECTION AND EVALUATION

CROSS-REFERENCE TO RELATED APPLICATIONS

This application is a continuation of U.S. application Ser. No. 17/466,179, filed Sep. 3, 2021, the entire disclosure of which is incorporated herein by reference.

BACKGROUND

Vehicles that operate in an autonomous driving mode may transport passengers or cargo or other items from one location to another. While driving autonomously, a vehicle will use a perception system to perceive and interpret its surroundings using one or more sensors. For instance, the perception system and/or the vehicle's computing devices may process data from these sensors in order to identify objects as well as their characteristics such as location, shape, size, orientation, acceleration or deceleration, velocity, type, etc. This information is important for the vehicle's computing systems to make appropriate driving decisions for the vehicle. One important type of object is signage. There are many types of signs to inform or instruct road users, such as speed limit signs, yield signs, stop signs, etc. An inability to quickly detect and understand what a sign means could adversely impact how the vehicle operates autonomously.

BRIEF SUMMARY

The technology relates to a unified sign detection and classification methodology. A unified pipeline approach incorporates generic sign detection with a robust parallel classification strategy. Annotations may be applied to tie the classification information together and to address any conflicts. Identification of where the sign is in the vehicle's surrounding environment can provide contextual details, and identified signage can be associated with other objects in the vehicle's driving environment, which can be used to aid the vehicle in autonomous driving. This approach is extensible to add support for new sign types, which can be helpful for local or region-specific signage.

According to one aspect, a method of controlling a vehicle operating in an autonomous driving mode is provided. The method comprises receiving, by one or more sensors of a perception system of the vehicle, sensor data associated with objects in an external environment of the vehicle, the sensor data including camera imagery and lidar data; applying, by one or more processors of a computing system of the vehicle, a generic sign detector to the sensor data to identify whether one or more road signs are present in an external environment of the vehicle; identifying, by the one or more processors according to the generic sign detector, that a road sign is present in the external environment of the vehicle; predicting, by the one or more processors according to the generic sign detector, properties of the road sign; routing, by the one or more processors based on the predicted properties of the road sign, an image of the road sign to one or more selected sign classifiers of a group of sign classifiers to perform a sign type specific evaluation of the image; routing, by the one or more processors, the image of the road sign to a text and symbol detector to identify any text or symbols in the image; annotating, by the one or more processors, a sign type to the road sign based on (i) classification results from the sign type specific evaluation by each selected sign classifier and (ii) any text or symbol information identified by the text and symbol detector; and determining, by the one or more processors based on annotating the sign type, whether to cause the vehicle perform a driving action in the autonomous driving mode. The lidar data may include at least one of depth information, intensity information, or height information.

In one example, the method further comprises, upon annotating the sign type, performing a sign localization operation. In another example, the method further comprises, upon annotating the sign type, performing a sign-object association operation. The one or more selected sign classifiers can include one or more selected from the group consisting of a stop sign classifier, a speed limit sign classifier, a sign color classifier, or a regulatory sign classifier.

The properties of the road sign may include at least one of background color, a shape, a placement, depth, or heading. Here, the placement can be either handheld, temporary or permanent.

In a further example, identifying that the road sign is present includes generating or storing a set of details regarding objects detected in the vehicle's external environment. Here, identifying that the road sign is present may further include evaluating information about camera model or a camera image timestamp.

Each selected sign classifier may output either a specific sign type or an indication of an unknown type. Routing the image to the one or more selected sign classifiers and routing the image to the text and symbol detector may include cropping a region around the road sign. The generic sign detector may be trained to identify whether any road signs are present based on the sensor data. And each classifier in the group of sign classifiers may be separately trained based on cropped imagery to identify a respective sign type.

According to another aspect of the technology, a vehicle is configured to operate in an autonomous driving mode. The vehicle comprises a perception system, a driving system, a positioning system and a control system. The perception system includes one or more sensors configured to receive sensor data associated with objects in an external environment of the vehicle. The driving system includes a steering subsystem, an acceleration subsystem and a deceleration subsystem to control driving of the vehicle. The positioning system is configured to determine a current position of the vehicle. The control system includes one or more processors, and the control system operatively coupled to the driving system, the perception system and the positioning system. The control system is configured to: receive, from the one or more sensors of the perception system, the sensor data associated with objects in the external environment of the vehicle, in which the received sensor data includes camera imagery and lidar data; apply a generic sign detector to the sensor data to identify whether one or more road signs are present in an external environment of the vehicle; identify, according to the generic sign detector, that a road sign is present in the external environment of the vehicle; predict, according to the generic sign detector, properties of the road sign; route, based on the predicted properties of the road sign, an image of the road sign to one or more selected sign classifiers of a group of sign classifiers to perform a sign type specific evaluation of the image; route the image of the road sign to a text and symbol detector to identify any text or symbols in the image; annotate a sign type to the road sign based on (i) classification results from the sign type specific evaluation by each selected sign classifier and (ii) any text or symbol information identified by the text and symbol detector; and determine, based on annotating the sign type, whether to cause the driving system to perform a driving action in the autonomous driving mode.

The control system may be further configured to perform a sign localization operation upon annotation of the sign type. The control system may be further configured to perform a sign-object association operation upon annotation of the sign type. Identification that the road sign is present may include generation or storage of a set of details regarding objects detected in the vehicle's external environment. Alternatively or additionally, identification that the road sign is present may further include evaluation of information about camera model or a camera image timestamp. Routing the image to the one or more selected sign classifiers and routing the image to the text and symbol detector may include cropping a region around the road sign. And each selected sign classifier may output either a specific sign type or an indication of an unknown type.

BRIEF DESCRIPTION OF THE DRAWINGS

FIGS. 1A-B illustrate example self-driving vehicles in accordance with aspects of the technology.

FIGS. 5A-D illustrate a pipeline process and exemplary scenarios in accordance with aspects of the technology.

FIGS. 6A-B illustrate examples of detecting text and symbols in accordance with aspects of the technology.

FIGS. 7A-B illustrate classification examples in accordance with aspects of the technology.

FIG. 8 illustrates a pipeline process in accordance with aspects of the technology.

FIGS. 9A-D illustrate sign-object association scenes in accordance with aspects of the technology.

DETAILED DESCRIPTION

Figure 1B:
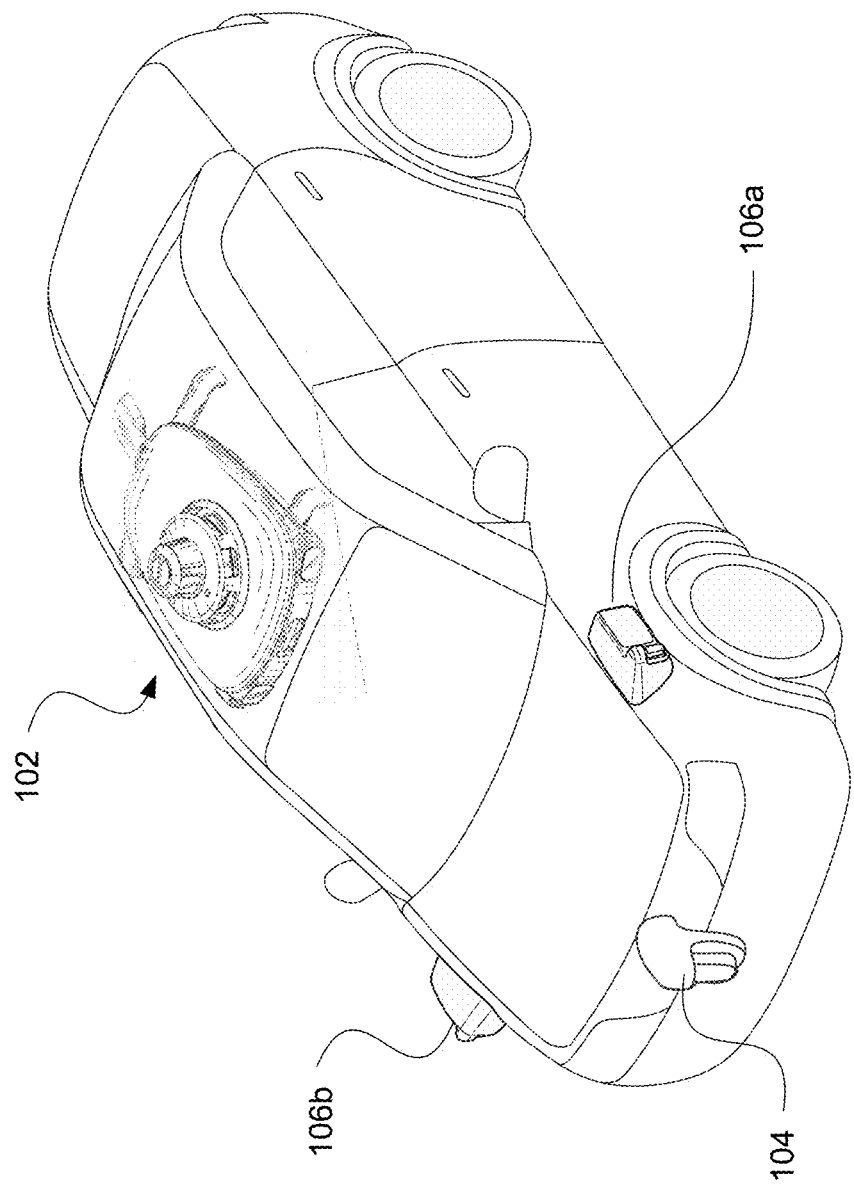

Operating a vehicle in an autonomous driving mode involves evaluating information about the vehicle's external environment. A perception system of the vehicle, which has one or more sensors such as lidar, radar and/or cameras, detects surrounding objects. There can be dynamic objects such as vehicles, bicyclists, joggers or pedestrians, or other road users moving around the environment. In addition to identifying dynamic objects, the perception system also detects static objects such as buildings, trees, signage, crosswalks or stop lines on the roadway, the presence of parked vehicles on a side of the roadway, etc.

Detecting and appropriately responding to traffic control devices such as signage can be particularly important when operating in an autonomous driving mode. However, there are many different road sign types used for different purposes, including regulatory signs (e.g., a stop, yield, no turn or speed limit sign), warning signs (e.g., notifying about an upcoming road condition such as a sharp turn or a no passing zone), school zone signs (e.g., identifying a school crossing or slow zone), guide signs (e.g., that provide information about a state our local route marker), emergency management and civil defense signs, motorist service and recreational signs (e.g., that provide information about nearby facilities), as well as temporary traffic control signs (which may be positioned on or adjacent to a roadway). In the United States, the Manual on Uniform Traffic Control Devices (MUTCD) provides standards as to the size, shape, color, etc., for such signage.

In many situations the signage may be readily visible and simple to understand. However, other situations such as alternatives for a given sign, signs that indicate multiple conditions (e.g., permitted turns from different lanes), location-specific signs or non-standard signs can be challenging to not only detect, but to also understand and react to. By way of example, no-turn signage may have text that states "NO TURN ON RED", a right-turn arrow inside a crossed-out red circle without any text, both text and the arrow indicator, date and/or time restrictions, etc. In order to avoid undue delay, the vehicle needs to correctly identify the sign and respond appropriately.

Different approaches can be employed to detect and evaluate signage. For instance, images from camera sensors could be applied to a detector that employs machine learning (ML) to identify what the sign is. This could be enhanced by adding template matching to the ML approach. Imagery and lidar data could be employed to find high intensity patches, using an ML classifier to detect, e.g., speed limit signs. For non-standard or region-specific signage, camera and lidar information may be used to try to identify what the sign is. Alternatively, ray tracing may be applied to camera imagery to perform text detection to infer what the sign says. However, such specific approaches may be computationally intensive (e.g., have a high computation "cost" to the onboard computing system), may be difficult to maintain, and may not be scalable or extensible to new signs or variations of known signs.

According to aspects of the technology, sensor information such as camera imagery and lidar depth, intensity and height (elevation) information are applied to a sign detector module. This enables the system to detect the presence of a given sign. A modular classification approach is applied to the detected sign. This can include selective application of one or more trained machine learning classifiers, as well as a text and symbol detector. An annotator can be used to arbitrate between the results to identify a specific sign type. Additional enhancements can also be applied, such as identifying the location (localization) of the signage in the surrounding 3D scene, and associating the sign with other nearby objects in the driving environment. And should the system not be able to determine what the specific sign type is or what it means, the vehicle could send the details to a remote assistance service to determine how to handle the sign (e.g., by updating an electronic map).

Example Vehicle Systems

The technology may be employed in all manner of vehicles configured to operate in an autonomous driving mode, including vehicles that transport passengers or items such as food deliveries, packages, cargo, etc. While certain aspects of the disclosure may be particularly useful in connection with specific types of vehicles, the vehicle may be one of many different types of vehicles including, but not limited to, cars, vans, motorcycles, cargo vehicles, buses, recreational vehicles, emergency vehicles, construction equipment, etc.

FIG. 1A illustrates a perspective view of an example passenger vehicle 100, such as a minivan or sport utility vehicle (SUV). FIG. 1B illustrates a perspective view of another example passenger vehicle 120, such as a sedan. The passenger vehicles may include various sensors for obtaining information about the vehicle's external environment. For instance, a roof-top housing unit (roof pod assembly) 102 may include one or more lidar sensors as well as various cameras (e.g., optical or infrared), radar units, acoustical sensors (e.g., microphone or sonar-type sensors), inertial (e.g., accelerometer, gyroscope, etc.) or other sensors (e.g., positioning sensors such as GPS sensors). Housing 104, located at the front end of vehicle 100, and housings 106a, 106b on the driver's and passenger's sides of the vehicle may each incorporate lidar, radar, camera and/or other sensors. For example, housing 106a may be located in front of the driver's side door along a quarter panel of the vehicle. As shown, the passenger vehicle 100 also includes housings 108a, 108b for radar units, lidar and/or cameras also located towards the rear roof portion of the vehicle. Additional lidar, radar units and/or cameras (not shown) may be located at other places along the vehicle 100. For instance, arrow 110 indicates that a sensor unit (not shown) may be positioned along the rear of the vehicle 100, such as on or adjacent to the bumper. Depending on the vehicle type and sensor housing configuration(s), acoustical sensors may be disposed in any or all of these housings around the vehicle.

Arrow 114 indicates that the roof pod 102 as shown includes a base section coupled to the roof of the vehicle. And arrow 116 indicated that the roof pod 102 also includes an upper section raised above the base section. Each of the base section and upper section may house different sensor units configured to obtain information about objects and conditions in the environment around the vehicle. The roof pod 102 and other sensor housings may also be disposed along vehicle 120 of FIG. 1B. By way of example, each sensor unit may include one or more sensors of the types described above, such as lidar, radar, camera (e.g., optical or infrared), acoustical (e.g., a passive microphone or active sound emitting sonar-type sensor), inertial (e.g., accelerometer, gyroscope, etc.) or other sensors (e.g., positioning sensors such as GPS sensors).

Figure 1C:
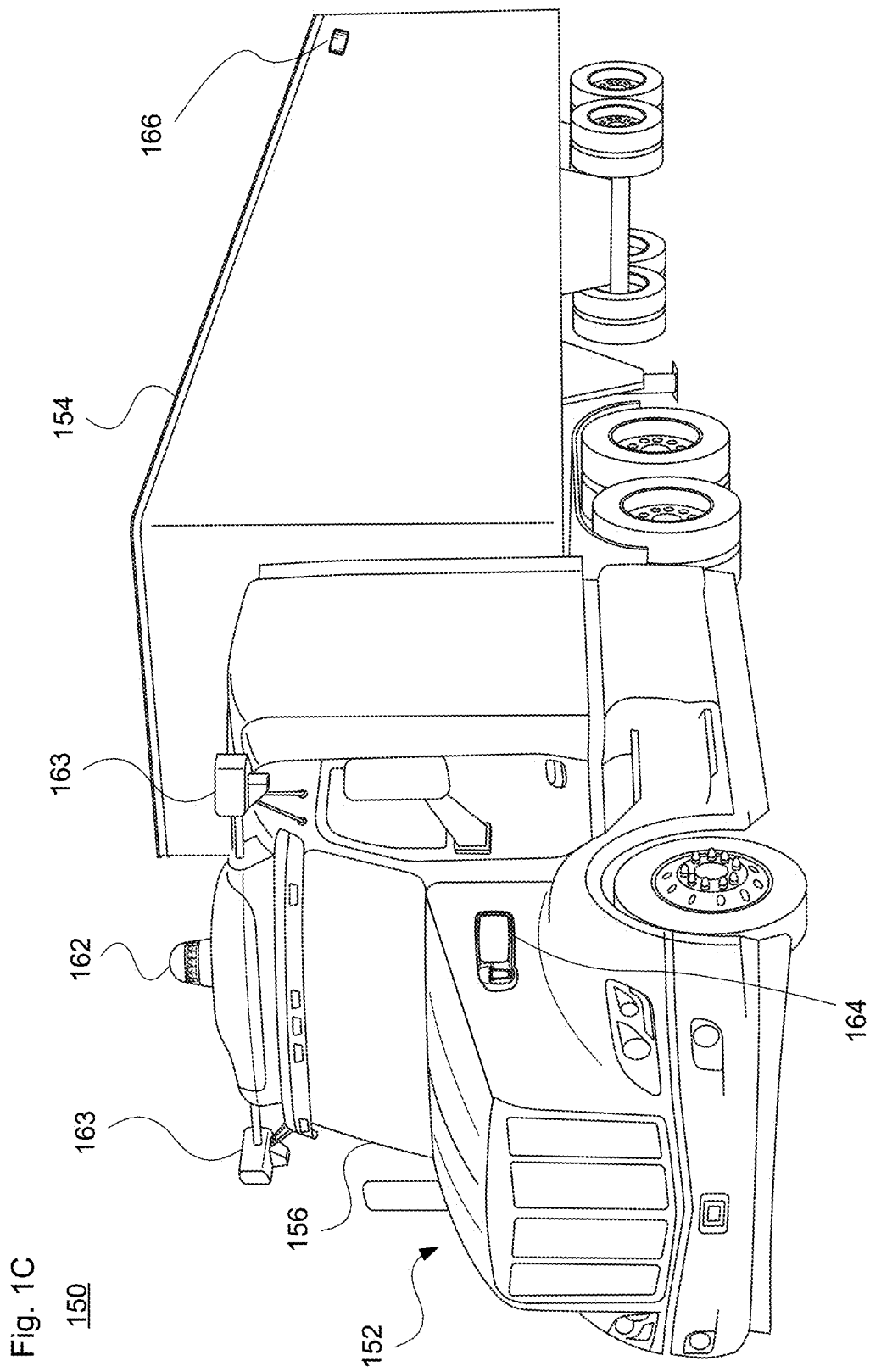
FIGS. 1C-D illustrate an example cargo-type vehicle configured for use with aspects of the technology.
Figure 1D:
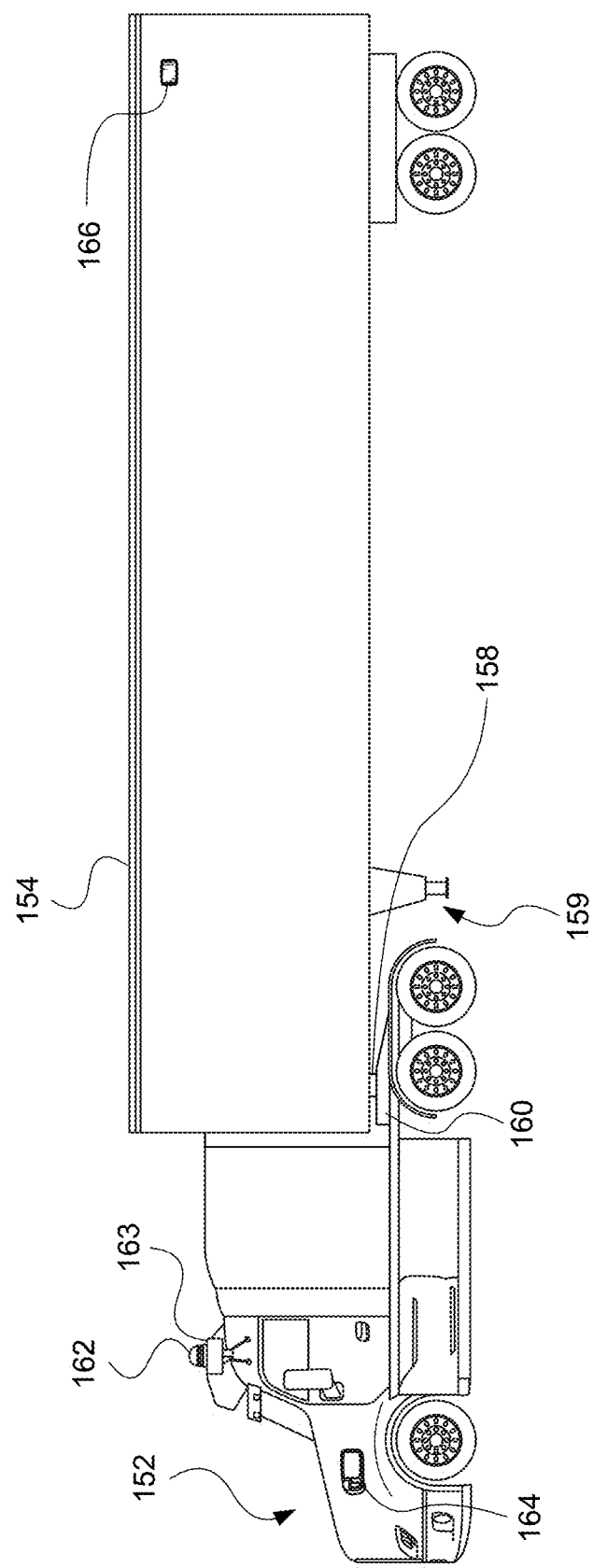

FIGS. 1C-D illustrate an example cargo vehicle 150, such as a tractor-trailer truck. The truck may include, e.g., a single, double or triple trailer, or may be another medium or heavy-duty truck such as in commercial weight classes 4 through 8. As shown, the truck includes a tractor unit 152 and a single cargo unit or trailer 154. The trailer 154 may be fully enclosed, open such as a flat bed, or partially open depending on the type of goods or other cargo to be transported. In this example, the tractor unit 152 includes the engine and steering systems (not shown) and a cab 156 for a driver and any passengers.

As seen in FIG. 1D, the trailer 154 includes a hitching point, known as a kingpin, 158, as well as landing gear 159 for when the trailer is detached from the tractor unit. The kingpin 158 is typically formed as a solid steel shaft, which is configured to pivotally attach to the tractor unit 152. In particular, the kingpin 158 attaches to a trailer coupling 160, known as a fifth-wheel, that is mounted rearward of the cab. For a double or triple tractor-trailer, the second and/or third trailers may have simple hitch connections to the leading trailer. Or, alternatively, each trailer may have its own kingpin. In this case, at least the first and second trailers could include a fifth-wheel type structure arranged to couple to the next trailer.

As shown, the tractor may have one or more sensor units 162, 163 and 164 disposed therealong. For instance, one or more sensor units 162 and/or 163 may be disposed on a roof or top portion of the cab 156 (e.g., centrally as in sensor unit 162 or a pair mounted on opposite sides such as sensor units 163), and one or more side sensor units 164 may be disposed on left and/or right sides of the cab 156. Sensor units may also be located along other regions of the cab 156, such as along the front bumper or hood area, in the rear of the cab, adjacent to the fifth-wheel, underneath the chassis, etc. The trailer 154 may also have one or more sensor units 166 disposed therealong, for instance along one or both side panels, front, rear, roof and/or undercarriage of the trailer 154.

As with the sensor units of the passenger vehicles of FIGS. 1A-B, each sensor unit of the cargo vehicle may include one or more sensors, such as lidar, radar, camera (e.g., optical or infrared), acoustical (e.g., microphone or sonar-type sensor), inertial (e.g., accelerometer, gyroscope, etc.) or other sensors such as geolocation-based (e.g., GPS) positioning sensors, load cell or pressure sensors (e.g., piezoelectric or mechanical), inertial (e.g., accelerometer, gyroscope, etc.).

There are different degrees of autonomy that may occur for a vehicle operating in a partially or fully autonomous driving mode. The U.S. National Highway Traffic Safety Administration and the Society of Automotive Engineers have identified different levels to indicate how much, or how little, the vehicle controls the driving. For instance, Level 0 has no automation and the driver makes all driving-related decisions. The lowest semi-autonomous mode, Level 1, includes some drive assistance such as cruise control. At this level, the vehicle may operate in a strictly driver-information system without needing any automated control over the vehicle. Here, the vehicle's onboard sensors, relative positional knowledge between them, and a way for them to exchange data, can be employed to implement aspects of the technology as discussed herein. Level 2 has partial automation of certain driving operations, while Level 3 involves conditional automation that can enable a person in the driver's seat to take control as warranted. In contrast, Level 4 is a high automation level where the vehicle is able to drive without assistance in select conditions. And Level 5 is a fully autonomous mode in which the vehicle is able to drive without assistance in all situations. The architectures, components, systems and methods described herein can function in any of the semi or fully-autonomous modes, e.g., Levels 1-5, which are referred to herein as autonomous driving modes. Thus, reference to an autonomous driving mode includes both partial (levels 1-3) and full autonomy (levels 4-5).

Figure 2:
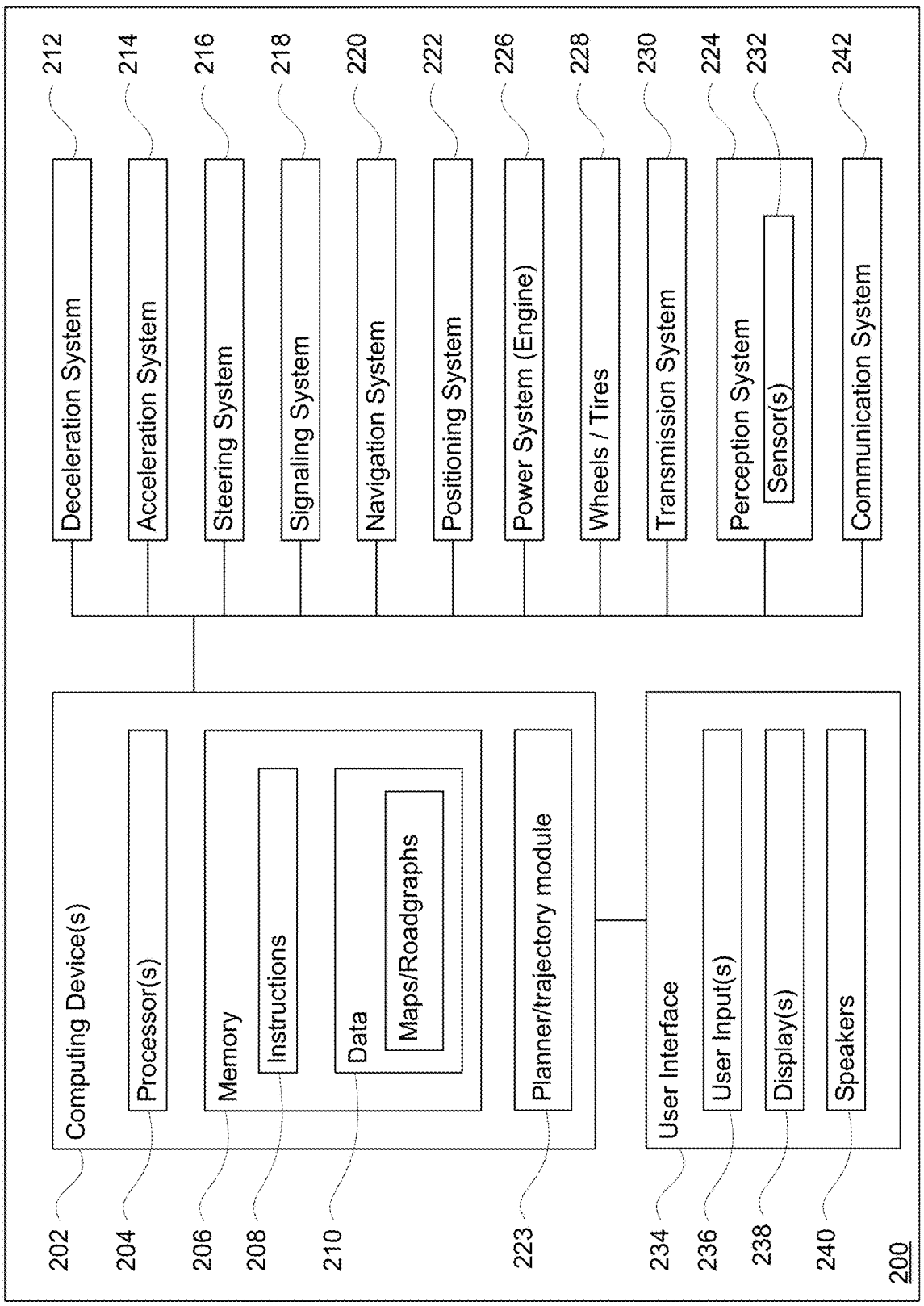
FIG. 2 illustrates components of a self-driving vehicle in accordance with aspects of the technology.

FIG. 2 illustrates a block diagram 200 with various components and systems of an exemplary vehicle, such as passenger vehicle 100 or 120, to operate in an autonomous driving mode. As shown, the block diagram 200 includes one or more computing devices 202, such as computing devices containing one or more processors 204, memory 206 and other components typically present in general purpose computing devices. The memory 206 stores information accessible by the one or more processors 204, including instructions 208 and data 210 that may be executed or otherwise used by the processor(s) 204. The computing system may control overall operation of the vehicle when operating in an autonomous driving mode.

The memory 206 stores information accessible by the processors 204, including instructions 208 and data 210 that may be executed or otherwise used by the processors 204.

For instance, the memory may include illumination-related information to perform, e.g., occluded vehicle detection. The memory 206 may be of any type capable of storing information accessible by the processor, including a computing device-readable medium. The memory is a non-transitory medium such as a hard-drive, memory card, optical disk, solid-state, etc. Systems may include different combinations of the foregoing, whereby different portions of the instructions and data are stored on different types of media.

The instructions 208 may be any set of instructions to be executed directly (such as machine code) or indirectly (such as scripts) by the processor(s). For example, the instructions may be stored as computing device code on the computing device-readable medium. In that regard, the terms "instructions", "modules" and "programs" may be used interchangeably herein. The instructions may be stored in object code format for direct processing by the processor, or in any other computing device language including scripts or collections of independent source code modules that are interpreted on demand or compiled in advance. The data 210, such as map (e.g., roadgraph) information, may be retrieved, stored or modified by one or more processors 204 in accordance with the instructions 208. In one example, some or all of the memory 206 may be an event data recorder or other secure data storage system configured to store vehicle diagnostics and/or detected sensor data, which may be on board the vehicle or remote, depending on the implementation.

The processors 204 may be any conventional processors, such as commercially available CPUs, GPUs, etc. Alternatively, each processor may be a dedicated device such as an ASIC or other hardware-based processor. Although FIG. 2 functionally illustrates the processors, memory, and other elements of computing devices 202 as being within the same block, such devices may actually include multiple processors, computing devices, or memories that may or may not be stored within the same physical housing. Similarly, the memory 206 may be a hard drive or other storage media located in a housing different from that of the processor(s) 204. Accordingly, references to a processor or computing device will be understood to include references to a collection of processors or computing devices or memories that may or may not operate in parallel.

In one example, the computing devices 202 may form an autonomous driving computing system incorporated into vehicle 100. The autonomous driving computing system may be capable of communicating with various components of the vehicle. For example, the computing devices 202 may be in communication with various systems of the vehicle, including a driving system including a deceleration system 212 (for controlling braking of the vehicle), acceleration system 214 (for controlling acceleration of the vehicle), steering system 216 (for controlling the orientation of the wheels and direction of the vehicle), signaling system 218 (for controlling turn signals), navigation system 220 (for navigating the vehicle to a location or around objects) and a positioning system 222 (for determining the position of the vehicle, e.g., including the vehicle's pose, e.g., position and orientation along the roadway or pitch, yaw and roll of the vehicle chassis relative to a coordinate system). The autonomous driving computing system may employ a planner/trajectory module 223, in accordance with the navigation system 220, the positioning system 222 and/or other components of the system, e.g., for determining a route from a starting point to a destination, for identifying a stop location at an intersection, for adjusting a short-term trajectory in view of a specific traffic sign, or for making modifications to various driving aspects in view of current or expected traction conditions.

The computing devices 202 are also operatively coupled to a perception system 224 (for detecting objects in the vehicle's environment), a power system 226 (for example, a battery and/or internal combustion engine) and a transmission system 230 in order to control the movement, speed, etc., of the vehicle in accordance with the instructions 208 of memory 206 in an autonomous driving mode which does not require or need continuous or periodic input from a passenger of the vehicle. Some or all of the wheels/tires 228 are coupled to the transmission system 230, and the computing devices 202 may be able to receive information about tire pressure, balance and other factors that may impact driving in an autonomous mode.

The computing devices 202 may control the direction and speed of the vehicle, e.g., via the planner/trajectory module 223, by causing actuation of various components. By way of example, computing devices 202 may navigate the vehicle to a destination location completely autonomously using data from map information and navigation system 220. Computing devices 202 may use the positioning system 222 to determine the vehicle's location and the perception system 224 to detect and respond to objects when needed to reach the location safely. In order to do so, computing devices 202 may cause the vehicle to accelerate (e.g., by increasing fuel or other energy provided to the engine by acceleration system 214), decelerate (e.g., by decreasing the fuel supplied to the engine, changing gears, and/or by applying brakes by deceleration system 212), change direction (e.g., by turning the front or other wheels of vehicle 100 by steering system 216), and signal such changes (e.g., by lighting turn signals of signaling system 218). Thus, the acceleration system 214 and deceleration system 212 may be a part of a drivetrain or other type of transmission system 230 that includes various components between an engine of the vehicle and the wheels of the vehicle. Again, by controlling these systems, computing devices 202 may also control the transmission system 230 of the vehicle in order to maneuver the vehicle autonomously.

Navigation system 220 may be used by computing devices 202 in order to determine and follow a route to a location. In this regard, the navigation system 220 and/or memory 206 may store map information, e.g., highly detailed maps that computing devices 202 can use to navigate or control the vehicle. While the map information may be image-based maps, the map information need not be entirely image based (for example, raster). For instance, the map information may include one or more roadgraphs, graph networks or road networks of information such as roads, lanes, intersections, and the connections between these features which may be represented by road segments. Each feature in the map may also be stored as graph data and may be associated with information such as a geographic location and whether or not it is linked to other related features, for example, signage (e.g., a stop, yield or turn sign) or road markings (e.g., stop lines or crosswalks) may be linked to a road and an intersection, etc. In some examples, the associated data may include grid-based indices of a road network to allow for efficient lookup of certain road network features.

In this regard, the map information may include a plurality of graph nodes and edges representing road or lane segments that together make up the road network of the map information. In this case, each edge may be defined by a starting graph node having a specific geographic location (e.g., latitude, longitude, altitude, etc.), an ending graph node having a specific geographic location (e.g., latitude, longitude, altitude, etc.), and a direction. This direction may refer to a direction the vehicle must be moving in in order to follow the edge (i.e., a direction of traffic flow). The graph nodes may be located at fixed or variable distances. For instance, the spacing of the graph nodes may range from a few centimeters to a few meters and may correspond to the speed limit of a road on which the graph node is located. In this regard, greater speeds may correspond to greater distances between graph nodes.

Thus, the maps may identify the shape and elevation of roadways, lane markers, intersections, stop lines, crosswalks, speed limits, traffic signal lights, buildings, signs, real time traffic information, vegetation, or other such objects and information. The lane markers may include features such as solid or broken double or single lane lines, solid or broken lane lines, reflectors, etc. A given lane may be associated with left and/or right lane lines or other lane markers that define the boundary of the lane. Thus, most lanes may be bounded by a left edge of one lane line and a right edge of another lane line.

The perception system 224 includes sensors 232 for detecting objects external to the vehicle. The detected objects may be other vehicles, obstacles in the roadway, traffic signals, signs, road markings (e.g., crosswalks and stop lines), objects adjacent to the roadway such as sidewalks, trees or shrubbery, etc. The sensors 232 may also detect certain aspects of weather conditions, such as snow, rain or water spray, or puddles, ice or other materials on the roadway.

By way of example only, the sensors of the perception system may include light detection and ranging (lidar) sensors, radar units, cameras (e.g., optical imaging devices, with or without a neutral-density filter (ND) filter), positioning sensors (e.g., gyroscopes, accelerometers and/or other inertial components), infrared sensors, and/or any other detection devices that record data which may be processed by computing devices 202. The perception system 224 may also include one or more microphones or other acoustical arrays, for instance arranged along the roof pod 102 and/or other sensor assembly housings, as well as pressure or inertial sensors, etc.

Such sensors of the perception system 224 may detect objects in the vehicle's external environment and their characteristics such as location, orientation (pose) relative to the roadway, size, shape, type (for instance, vehicle, pedestrian, bicyclist, etc.), heading, speed of movement relative to the vehicle, etc., as well as environmental conditions around the vehicle. The perception system 224 may also include other sensors within the vehicle to detect objects and conditions within the vehicle, such as in the passenger compartment. For instance, such sensors may detect, e.g., one or more persons, pets, packages, etc., as well as conditions within and/or outside the vehicle such as temperature, humidity, etc. Still further sensors 232 of the perception system 224 may measure the rate of rotation of the wheels 228, an amount or a type of braking by the deceleration system 212, and other factors associated with the equipment of the vehicle itself.

The raw data obtained by the sensors (e.g., camera imagery, lidar point cloud data, radar return signals) can be processed by the perception system 224 and/or sent for further processing to the computing devices 202 periodically or continuously as the data is generated by the perception system 224. Computing devices 202 may use the positioning system 222 to determine the vehicle's location and perception system 224 to detect and respond to objects and roadway information (e.g., signage or road markings) when needed to reach the location safely, such as by adjustments made by planner/trajectory module 223, including adjustments in operation to deal with occlusions and other issues.

As illustrated in FIGS. 1A-B, certain sensors of the perception system 224 may be incorporated into one or more sensor assemblies or housings. In one example, these may be integrated into front, rear or side perimeter sensor assemblies around the vehicle. In another example, other sensors may be part of the roof-top housing (roof pod) 102. The computing devices 202 may communicate with the sensor assemblies located on or otherwise distributed along the vehicle. Each assembly may have one or more types of sensors such as those described above.

Returning to FIG. 2, computing devices 202 may include all of the components normally used in connection with a computing device such as the processor and memory described above as well as a user interface subsystem 234. The user interface subsystem 234 may include one or more user inputs 236 (e.g., a mouse, keyboard, touch screen and/or microphone) and one or more display devices 238 (e.g., a monitor having a screen or any other electrical device that is operable to display information). In this regard, an internal electronic display may be located within a cabin of the vehicle (not shown) and may be used by computing devices 202 to provide information to passengers within the vehicle. Other output devices, such as speaker(s) 240 may also be located within the passenger vehicle to provide information to riders, or to communicate with users or other people outside the vehicle.

The vehicle may also include a communication system 242. For instance, the communication system 242 may also include one or more wireless configurations to facilitate communication with other computing devices, such as passenger computing devices within the vehicle, computing devices external to the vehicle such as in other nearby vehicles on the roadway, and/or a remote server system. Connections may include short range communication protocols such as Bluetooth™, Bluetooth™ low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

Figure 3A:
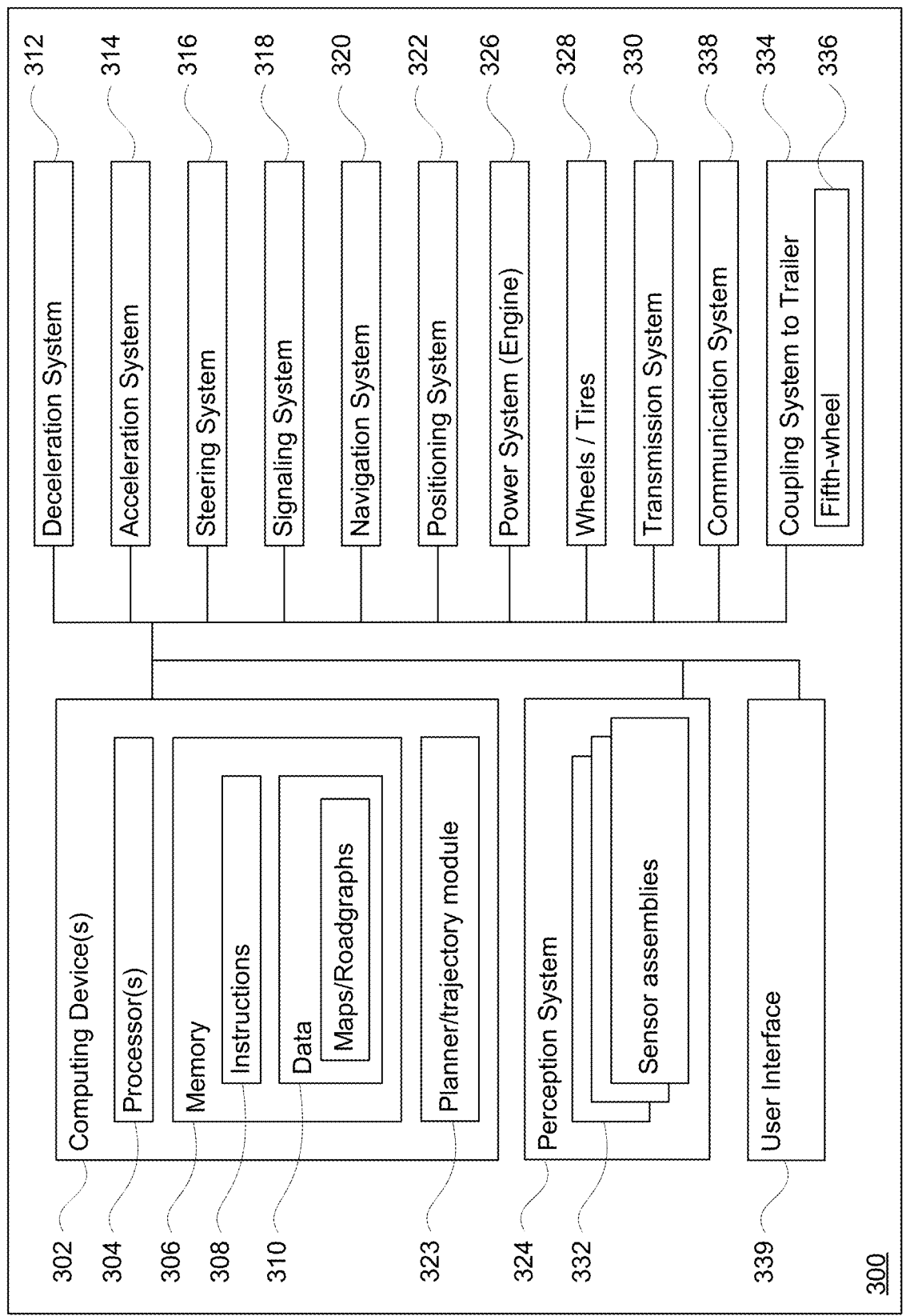
FIGS. 3A-B are block diagrams of systems of an example cargo-type vehicle in accordance with aspects of the technology.

FIG. 3A illustrates a block diagram 300 with various components and systems of a vehicle, e.g., vehicle 150 of FIGS. 1C-D. By way of example, the vehicle may be a truck, farm equipment or construction equipment, configured to operate in one or more autonomous modes of operation. As shown in the block diagram 300, the vehicle includes a control system of one or more computing devices, such as computing devices 302 containing one or more processors 304, memory 306 and other components similar or equivalent to components 202, 204 and 206 discussed above with regard to FIG. 2. For instance, the data may include map-related information (e.g., roadgraphs) to perform a stop line determination.

The control system may constitute an electronic control unit (ECU) of a tractor unit of a cargo vehicle. As with instructions 208, the instructions 308 may be any set of instructions to be executed directly (such as machine code) or indirectly (such as scripts) by the processor. Similarly, the data 310 may be retrieved, stored or modified by one or more processors 304 in accordance with the instructions 308.

In one example, the computing devices 302 may form an autonomous driving computing system incorporated into vehicle 150. Similar to the arrangement discussed above regarding FIG. 2, the autonomous driving computing system of block diagram 300 may be capable of communicating with various components of the vehicle in order to perform route planning and driving operations. For example, the computing devices 302 may be in communication with various systems of the vehicle, such as a driving system including a deceleration system 312, acceleration system 314, steering system 316, signaling system 318, navigation system 320 and a positioning system 322, each of which may function as discussed above regarding FIG. 2.

The computing devices 302 are also operatively coupled to a perception system 324, a power system 326 and a transmission system 330. Some or all of the wheels/tires 228 are coupled to the transmission system 230, and the computing devices 202 may be able to receive information about tire pressure, balance, rotation rate and other factors that may impact driving in an autonomous mode. As with computing devices 202, the computing devices 302 may control the direction and speed of the vehicle by controlling various components. By way of example, computing devices 302 may navigate the vehicle to a destination location completely autonomously using data from the map information and navigation system 320. Computing devices 302 may employ a planner/trajectory module 323, in conjunction with the positioning system 322, the perception system 324 and other subsystems to detect and respond to objects when needed to reach the location safely, similar to the manner described above for FIG. 2.

Similar to perception system 224, the perception system 324 also includes one or more sensors or other components such as those described above for detecting objects external to the vehicle, objects or conditions internal to the vehicle, and/or operation of certain vehicle equipment such as the wheels and deceleration system 312. For instance, as indicated in FIG. 3A the perception system 324 includes one or more sensor assemblies 332. Each sensor assembly 232 includes one or more sensors. In one example, the sensor assemblies 332 may be arranged as sensor towers integrated into the side-view mirrors on the truck, farm equipment, construction equipment or the like. Sensor assemblies 332 may also be positioned at different locations on the tractor unit 152 or on the trailer 154, as noted above with regard to FIGS. 1C-D. The computing devices 302 may communicate with the sensor assemblies located on both the tractor unit 152 and the trailer 154. Each assembly may have one or more types of sensors such as those described above.

Also shown in FIG. 3A is a coupling system 334 for connectivity between the tractor unit and the trailer. The coupling system 334 may include one or more power and/or pneumatic connections (not shown), and a fifth-wheel 336 at the tractor unit for connection to the kingpin at the trailer. A communication system 338, equivalent to communication system 242, is also shown as part of vehicle system 300.

Similar to FIG. 2, in this example the cargo truck or other vehicle may also include a user interface subsystem 339. The user interface subsystem 339 may be located within the cabin of the vehicle and may be used by computing devices 202 to provide information to passengers within the vehicle, such as a truck driver who is capable of driving the truck in a manual driving mode.

Figure 3B:
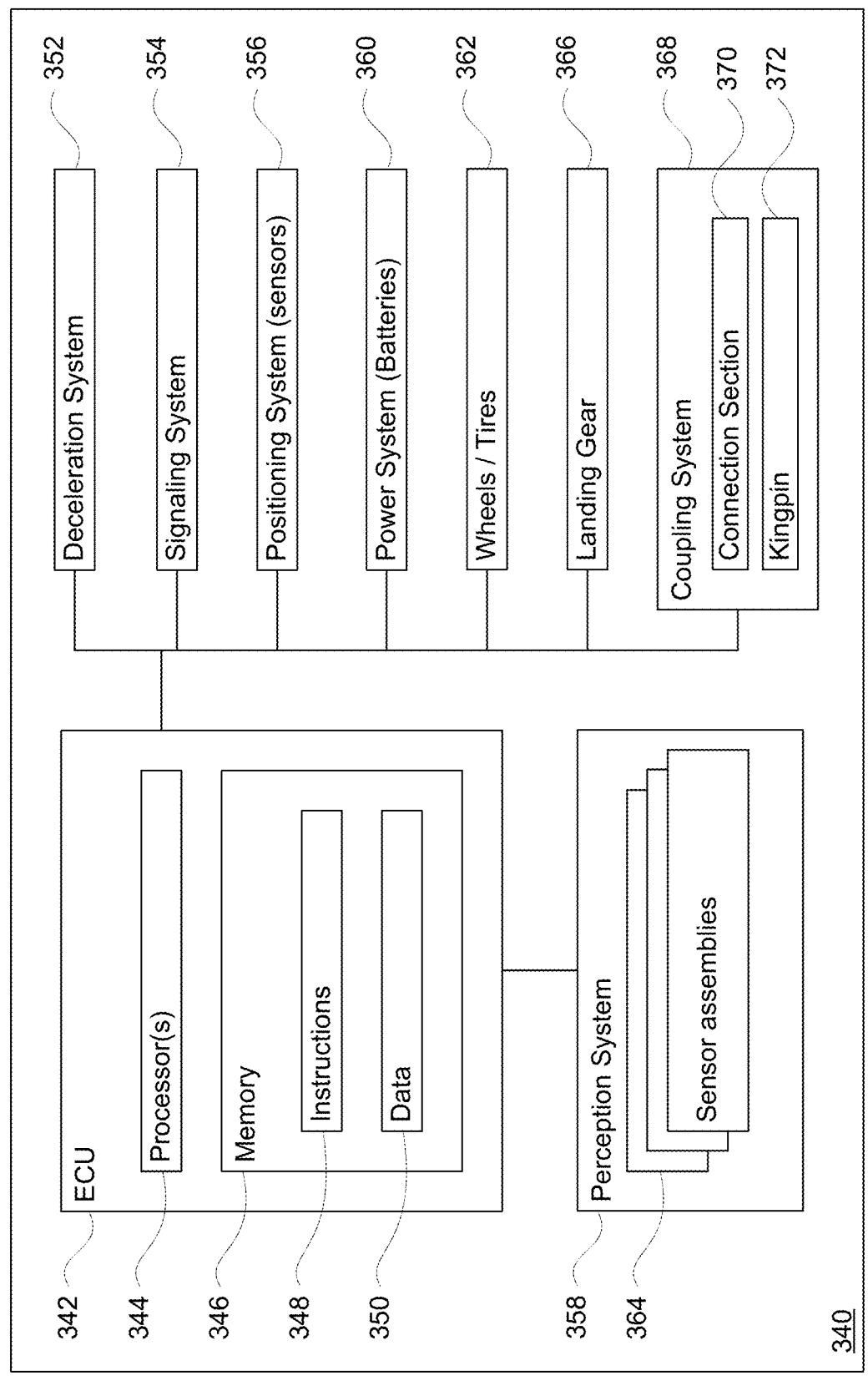

FIG. 3B illustrates an example block diagram 340 of systems of the trailer, such as trailer 154 of FIGS. 1C-D. As shown, the system includes a trailer ECU 342 of one or more computing devices, such as computing devices containing one or more processors 344, memory 346 and other components typically present in general purpose computing devices. The memory 346 stores information accessible by the one or more processors 344, including instructions 348 and data 350 that may be executed or otherwise used by the processor(s) 344. The descriptions of the processors, memory, instructions and data from FIGS. 2 and 3A apply to these elements of FIG. 3B.

The trailer ECU 342 is configured to receive information and control signals from the tractor unit, as well as information from various trailer components. The on-board processors 344 of the ECU 342 may communicate with various systems of the trailer, including a deceleration system 352, signaling system 354, and a positioning system 356. The ECU 342 may also be operatively coupled to a perception system 358 with one or more sensors arranged in sensor assemblies 364 for detecting objects in the trailer's environment. The ECU 342 may also be operatively coupled with a power system 360 (for example, a battery power supply) to provide power to local components. Some or all of the wheels/tires 362 of the trailer may be coupled to the deceleration system 352, and the processors 344 may be able to receive information about tire pressure, balance, wheel speed and other factors that may impact driving in an autonomous mode, and to relay that information to the processing system of the tractor unit. The deceleration system 352, signaling system 354, positioning system 356, perception system 358, power system 360 and wheels/tires 362 may operate in a manner such as described above with regard to FIGS. 2 and 3A.

The trailer also includes a set of landing gear 366, as well as a coupling system 368. The landing gear may provide a support structure for the trailer when decoupled from the tractor unit. The coupling system 368, which may be a part of coupling system 334, provides connectivity between the trailer and the tractor unit. Thus, the coupling system 368 may include a connection section 370 (e.g., for communication, power and/or pneumatic links to the tractor unit). The coupling system also includes a kingpin 372 configured for connectivity with the fifth-wheel of the tractor unit.

Example Implementations

Figure 4A:
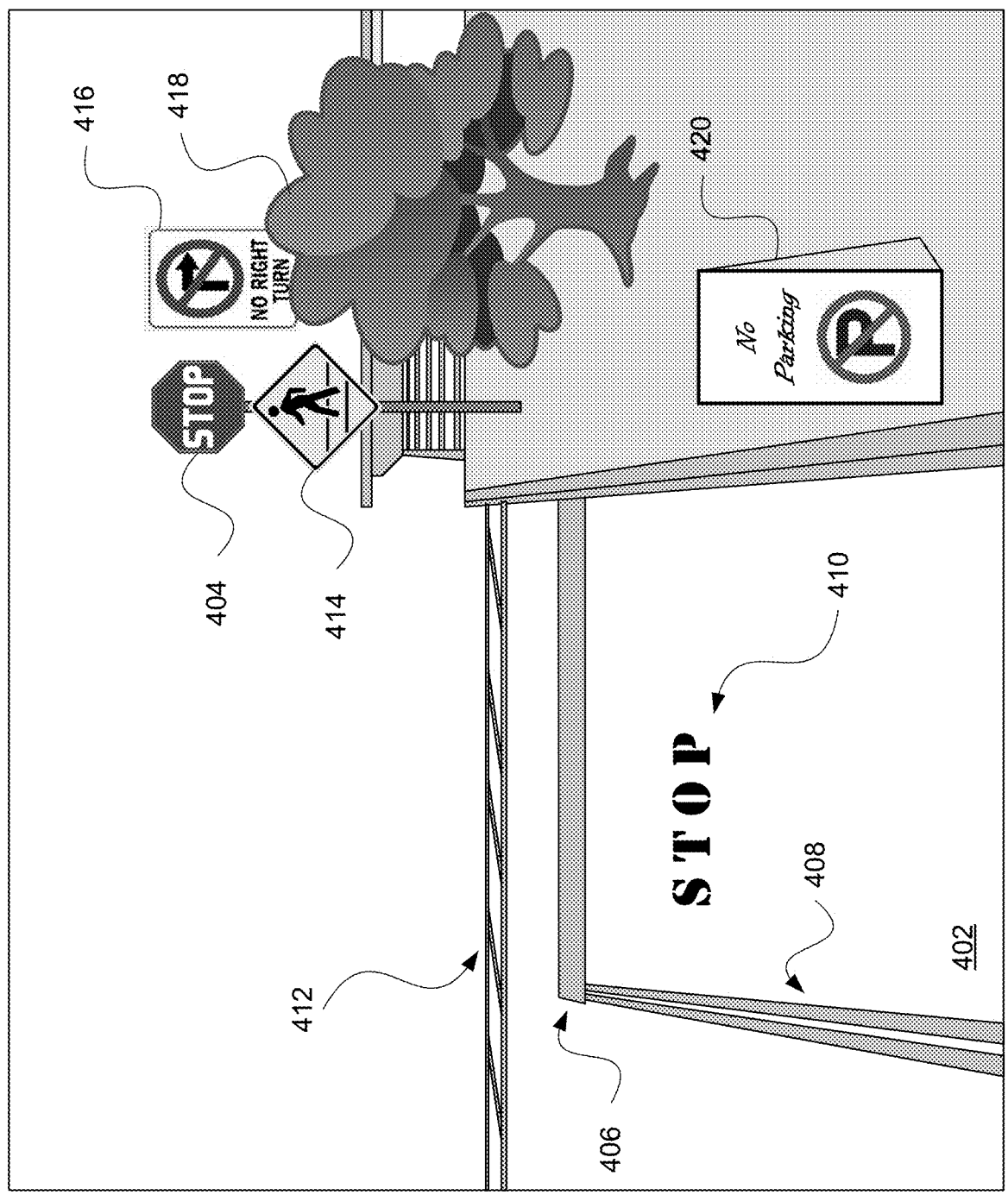
FIGS. 4A-B illustrate sign-related scenarios in accordance with aspects of the technology.

As noted above, there can be any number of reasons why it is challenging to detect and act on signs. View 400 of FIG. 4A illustrates a number of examples. In particular, FIG. 4A shows a roadway 402 at which there is a stop sign 404 at the intersection. Stop line 406 is painted on the roadway 402. The roadway 402 may also include lane lines 408 and/or "STOP" text or another graphic 410 indicating that vehicles should come to a stop at the intersection. In this example, a separate crosswalk 412 is present.

A pedestrian crossing sign 414 is positioned beneath the stop sign 404. Due to its placement, the sign 414 may be obscured by pedestrians walking in front of it. A no right turn sign 416 is also positioned near the intersection. Here, shrub 418 may at least partly obscure that sign from oncoming vehicles. Finally, a portable no parking sign 420 is placed along the curb. This sign may not comply with MUTCD standards, and thus may be hard to recognize, especially if it is placed at an angle relative to the roadway 402.

Figure 4B:
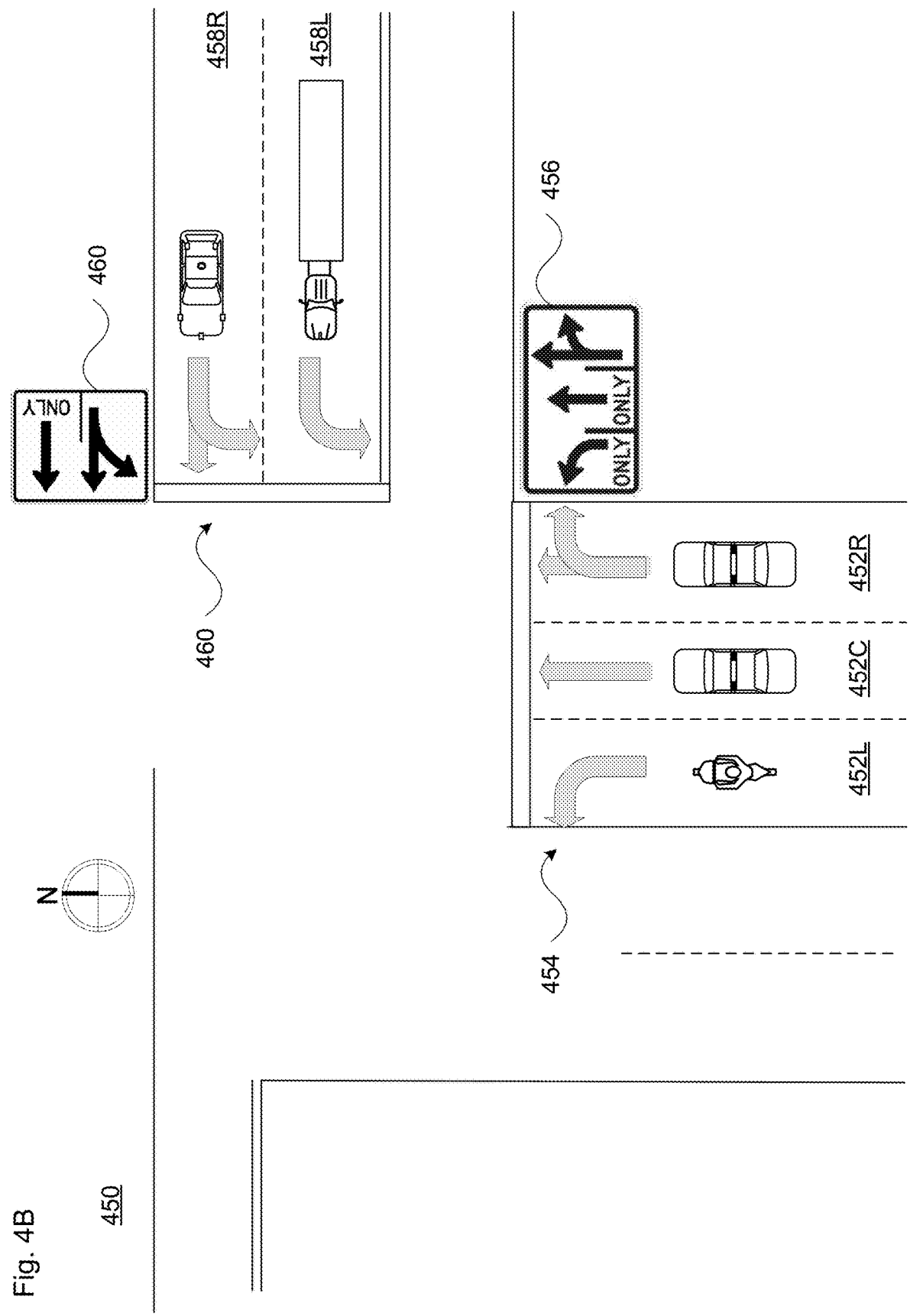

FIG. 4B illustrates another view 450, in which each sign applies to multiple lanes. Here, there are 3 northbound lanes 452L, 452C and 452R, in which each lane must either go left, straight or have the option to go straight or right. While arrows 454 may be painted on the roadway, sign 456 indicates the direction limitation(s) for each respective lane.

Similarly, westbound lanes 458L and 458R also have their own constraints. Here, the left lane 458L must turn left, while the right lane 458R can go either left or straight. These limitations are shown by arrows 460 painted on the roadway, as well as by sign 462. For an autonomously driven vehicle, it may be hard to detect the arrows painted on the road surface due to other vehicles. It may be easier to detect the signs 456 and 460, which may be suspended above the roadway. However, it can be challenging to identify the requirements for each specific lane, and how the listed turn actions correlate to the lane the vehicle is in.

In order to address these and other signage situations, a pipeline architecture is provided. FIG. 5A illustrates view 500 of the pipeline, which employs an asynchronous, computational graph architecture. Initially, a set of sensor data for objects in the vehicle's driving environment is obtained from the perception system (e.g., perception system 224 of FIG. 2 or perception system 324 of FIG. 3A). As shown, the set of sensor data includes camera imagery 502, lidar depth information 504, lidar intensity information 506 and lidar height (elevation) information 508. The camera imagery may come from one or more cameras or other imaging devices disposed along the vehicle. The lidar information may come from lidar point cloud data obtained by one or more lidar units disposed along the vehicle. In some instances, imagery from one camera is processed as standalone imagery. In contrast, in other instances, imagery from multiple cameras of the perception system may be fused or otherwise integrated for processing. Some sensor information, e.g., secondary lidar returns, may be discarded prior to processing. Information from other sensors may also be utilized to augment the evaluation process.

At block 510, the input sensor data (e.g., each of 502-508) is received by a generic sign detector module. Employing a separate detector for every sign type is computationally inefficient and not scalable, since there are hundreds of sign types and adding a new sign type can require deploying an entirely new model. In addition, labels for each sign type may be independently collected through different labeling frameworks and policies, which further complicates an approach that employs separate detectors.

Thus, according to aspects of the technology, the generic detection approach results in detections for signs even if the sign type is not yet supported by the vehicle operating in the autonomous driving mode. This can provide useful information even without knowing the sign type. For instance, the density of signs can indicate a construction zone, or a large intersection or a highway interchange where there are many lanes that have different turning rules, weight limits, etc. Knowing that signs are present can enable the vehicle to request remote assistance to understand signs with interesting properties (e.g., a sign located where no sign is expected to be, a sign with a non-standard color and/or shape, or other interesting properties). The system can have different operating points for different applications (e.g., high recall to feed into the classifiers, since the classifiers can filter out false positives (and false negatives), and another high precision operating point for other downstream applications such as segmentation). For instance, a machine learning detector has many possible operating points, each with a corresponding recall and precision. Recall equals the percentage of true positive objects that the detector detects while precision equals the percentage of detected objects which are true positives. Since the detected output is fed to downstream classifiers, these can serve to filter out false positives (detected objects which are not really signs). However, if other downstream applications need to use the raw generic sign detection output, in that situation a higher precision operating point may be employed, which does not result in too many false positive detections (e.g., false positives that exceed some threshold).

The input to the detector is the entire camera image, while the input to classifiers is the detected patch (the portion of the image where the detector thinks there's a sign). Thus, another benefit to the generic detector approach is that it permits the system to train the detector less often, while retraining classifiers more often as new signs are surfaced. In addition, this approach provides an extensible system because splitting detection and classification makes the addition of new sign types easier. For example, this should only necessitate retraining the classifier(s) on image patches, but should not require retraining the detector. Also, the system can predict rich attributes as additional heads of the detector and benefit from the entire camera context as opposed to a camera patch, which for example can help with predicting sign placement (e.g., where in the scene the sign is located, and whether it is handheld, temporary or permanent, etc.). Here, some attributes such as sign placement require more context than just the patch. Consider a stop sign, which could be handheld (e.g., by a crossing guard or construction worker), on a school bus, on a permanent post, or on a temporary fixture such as a barricade or a cone. By only looking at the sign patch, it may be difficult or impossible to infer what kind of fixture to which the stop sign is attached. However, the full camera image can provide enough context to predict that. Multi-task learning has also proven to improve the performance across tasks. Thus, a neural network trained to predict sign attributes on top of the regular detection task can outperform one that does not predict attributes on the original detection problem.

In view of this, one aspect of the generic sign detector module is to identify the presence of any signs in the vicinity of the vehicle. Another aspect of the module is to predict sign properties such as background color (e.g., white/black, white/red, red, yellow, green, blue, etc.), shape (e.g., rectangle, octagon, etc.), placement, depth, and heading. In particular, this module is used to detect any signs, irrespective of type (e.g., stop sign, speed limit sign, etc.). At an initial detection stage, the system may generate and store (and/or output) a set of details regarding the detected objects, the camera model, and a timestamp with the camera readout time.

The set of details can include one or more of the following: (i) depth information (e.g., linear distance between the camera and the object), (ii) sign properties (e.g., sign type, confidence value for the sign type, placement (e.g., permanent, portable, handheld, on a school bus, on another vehicle type, unknown), etc.), (iii) the location of the detected object in the image frame, (iv) background color (e.g., white or black, red, yellow, orange, unknown), (v) speed limit sign properties (e.g., the speed limit value of the sign in miles per hour or kilometers per hour, a speed limit sign history of, e.g., the last observed speed limit sign, etc.) Other details may include, by way of example, sign shape and/or sign content. A unique identifier may be associated with the set of details for each detected object. Each sign placement may be assigned its own prediction score for how likely that placement is to be correct (e.g., a percentage value between 0-100%, a ranking of 1, 2 or 3, or some other score type). Similarly, the background color may or may not include a prediction, score or other ranking on the likelihood for a given color. And the sign shape may or may not be associated with a confidence value.

FIG. 5B shows an exemplary scenario 540 for generic sign detection, in which a vehicle 542 is approaching a block that has buildings including a pizza parlor 544, a post office 546 and a hair salon 548. As shown, there is a NO RIGHT TURN sign 550 at the corner, and a UTILITY WORK AHEAD sign 552 on the sidewalk. The dashed boxes around the signs indicate that they have been detected in the received imagery (e.g., via return signals indicated by the dash-dot lines from the boxes to the sensor module on the roof of the vehicle).

In this scenario, from the input sensor data the generic sign detector module may identify the sign 550 as being a white rectangle permanent fixture, which is 53 meters from the vehicle and at a 24° angle. It may also identify the sign 552 as being an orange diamond temporary fixture 27 meters from the vehicle and at a 14° angle. By way of example only, the sign 550 may be determined to be permanent due to the single central pole contacting the ground, while the sign 552 may be determined to be temporary due to the identification of a set of legs extending from the base of the sign support.

Following the initial detection stage, once the system generates the set of details regarding the detected objects, the generic sign detector module performs a sign dispatching operation. In particular, the general sign detector module takes in detections and corresponding attributes from the detection stage discussed above, and routes these detections to relevant classifiers in block 512 of FIG. 5A. For example, a detection deemed to have a red background can be routed to a stop sign classifier 514 but not to a speed limit sign classifier 516, a yellow and orange sign classifier 518, or a white regulatory sign classifier 522. Here, it may also route to other classifiers 522 and/or to a text and symbol detector 524. In another example, the text and symbol detector 524 may comprise separate detectors for text and symbols. This approach can significantly help with resource management in order to avoid having too many classifiers running at the same time on the same detections.

Figure 5C:
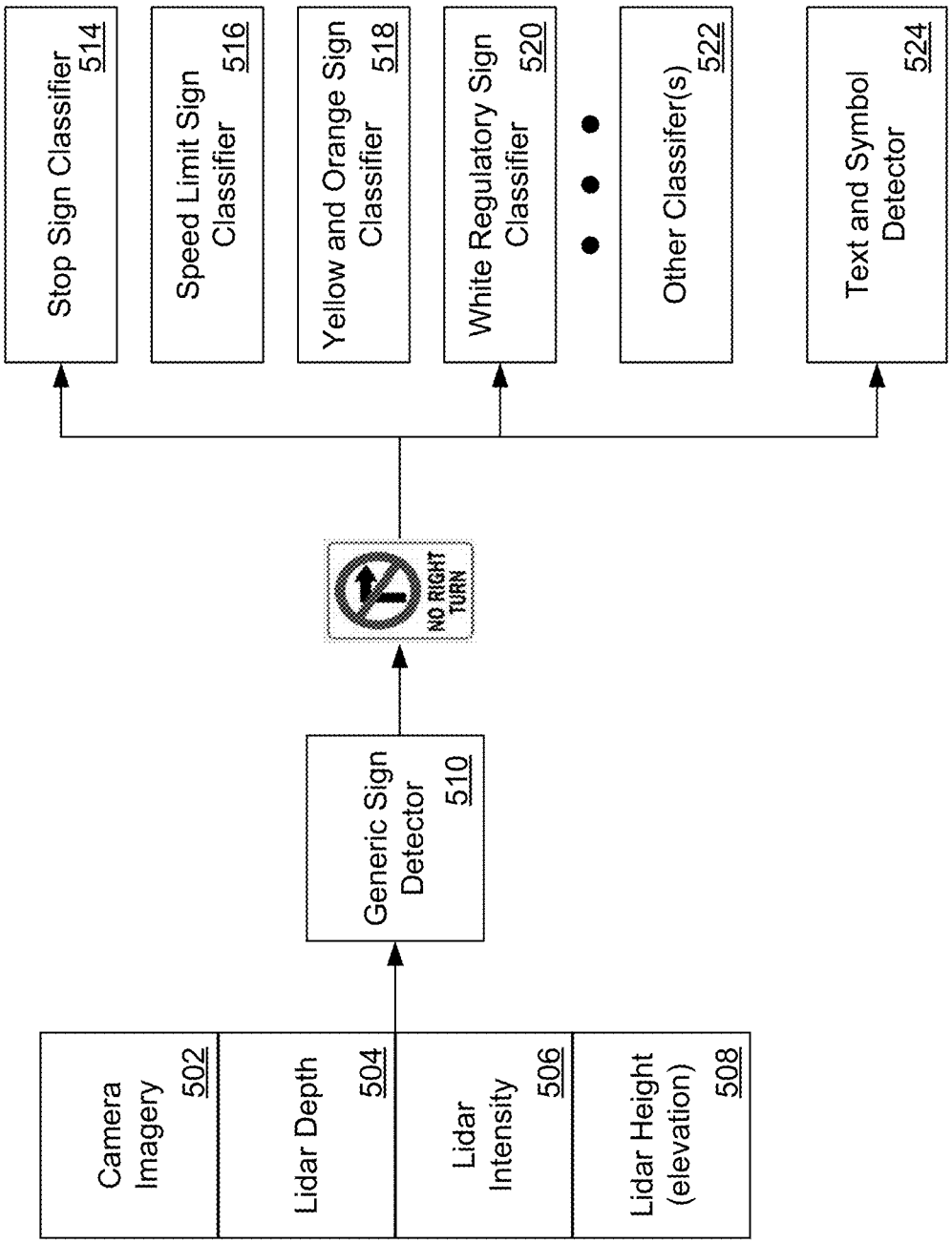
Figure 5D:
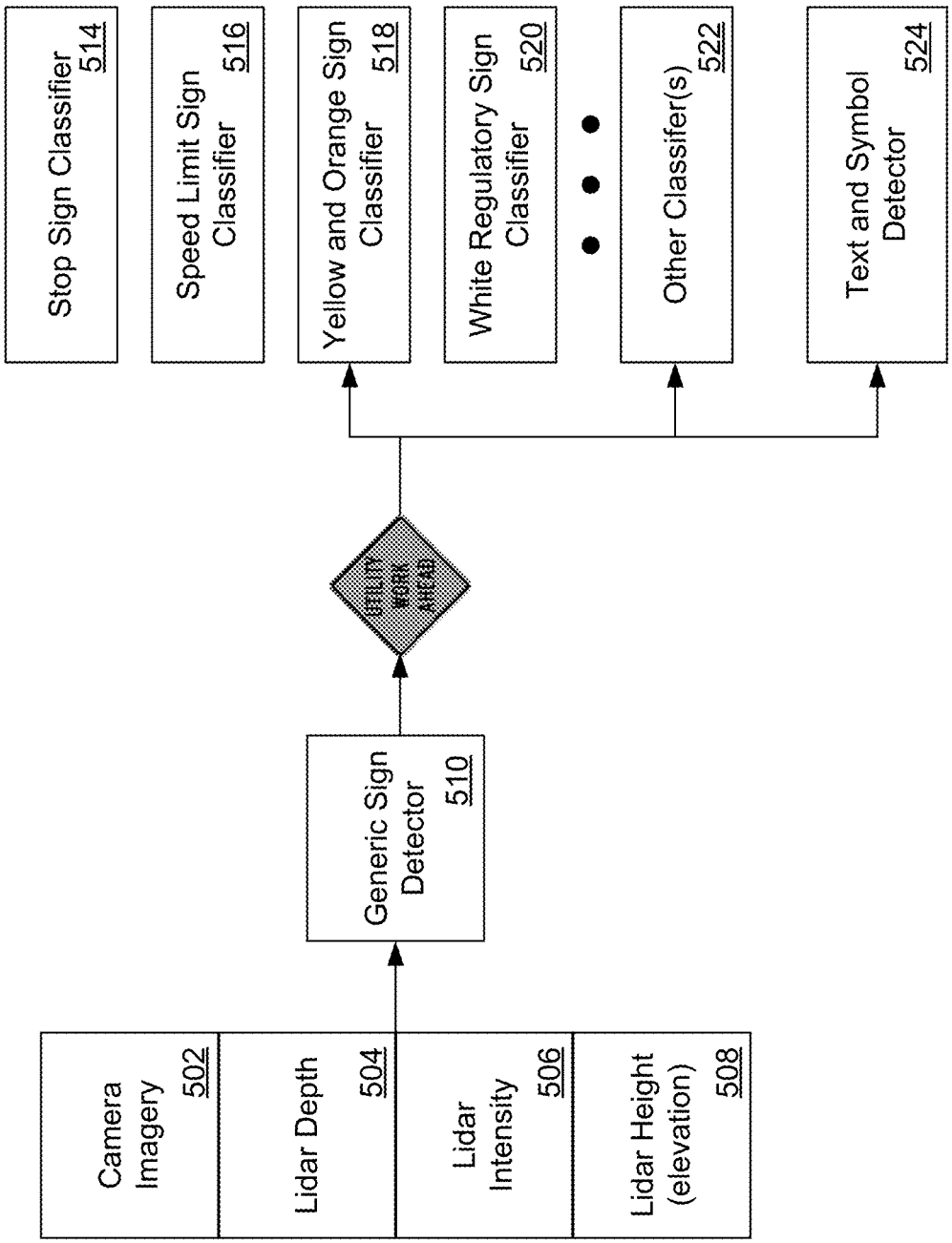

Thus, using the NO RIGHT TURN sign 550 of FIG. 5B, in example 560 of FIG. 5C, the general sign detector 510 may pass the sign's information on to the stop sign classifier 514, the white regulatory sign classifier 520, and the text and symbol detector 524. In contrast, for the UTILITY WORK AHEAD sign 552 of FIG. 5B, in example 580 of FIG. 5D, the general sign detector 510 may pass the sign's information on to the yellow and orange sign classifier 518, another classifier 522 (e.g., a construction warning classifier), and the text and symbol detector 524.

In addition to routing the detections to various classifiers, the dispatcher stage of operation by the generic sign detector is responsible for creating a batched input from the image patch detections. This involves cropping a region around each detected sign (as specified by the config file) and batches various detections into one input which will then go to the sign type classifier(s). The output of the dispatcher operation comprises image patches with corresponding object IDs. In one scenario, the output is a set of patches from one image, taken by one camera, where the generic sign detector indicated there could be a sign. For instance, the system may crop all the regions in a given image where the generic sign detector found a possible sign. This allows the system to trace a particular detection back to the corresponding imagery obtained by the perception system.

Every classifier in block 512 that receives an input from the dispatcher from the generic sign detector block runs its underlying deep neural network, e.g., a convolutional neural network (CNN), on the given input. The output of the sign classification stage is a mapping from object ID to the predicted scores over the classifier's classes. For example, speed limit sign classifier 516 may output predicted scores over the following classes:

Class 0: 15 mph
Class 1: 20 mph
Class 2: 25 mph
Class 3: 30 mph
Class 4: 35 mph
Class 5: 40 mph
Class 6: 45 mph
Class 7: 50 mph
Class 8: Other speed limit
Class 9: Not a speed limit In this particular example, for every object ID, the speed limit sign classifier 516 would output 10 predicted scores (i.e., one for each class).

Figure 6A:
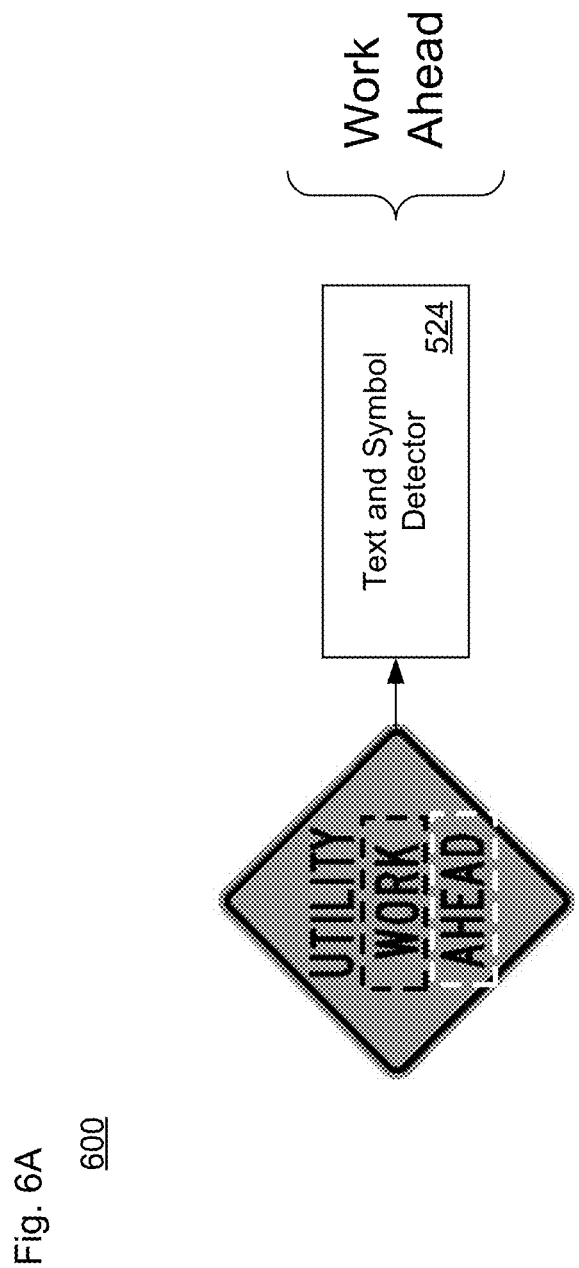

The text and symbol detector 524 detects individual components from a fixed vocabulary of keywords and symbols. For instance, as shown in example 600 of FIG. 6A, the detector identifies the words "Work" and "Ahead", which may be accounted for by the system (e.g., the planner/ trajectory module) to adjust the vehicle's speed and/or to change lanes from a prior planned path.

This separate detector is particularly helpful for long-tail cases and rare examples. For instance, as shown in the upper half of example 620 in FIG. 6B, there are many different ways to indicate no turn on red. And as shown in the lower half of this example, the text and symbol detector is able to parse out both text and symbols from different signs to arrive at a determination of "No Right Turn on Red".

Returning to FIG. 5A, after the classifiers and text/symbol detector in block 512 operate on the information for the detected sign(s), the results of those operations are sent to a sign type annotator block 526. Given the classifications from all sign type classifiers (as well as information from the text and symbol detector), the sign type annotator is responsible for creating an annotation regarding the particular type of sign it is. If an object is only classified by one classifier, the procedure is straightforward, since the object would be labeled as being of the type of that classifier. Thus, as shown in example 700 of FIG. 7A, if a stop sign was classified only by the stop sign classifier, with the text detected as "STOP", then the annotation would be "Stop Sign".

However, as shown in example 720 of FIG. 7B, if an object is classified by multiple classifiers (e.g., a white regulatory sign classifier and a turn restriction classifier), then, merging the two classification results can be more complicated. Here, the information from the text and symbol detector (e.g., "ONLY" and "ONLY" as the two recognized words, and multiple turning arrows as the symbols), then this information can be used in conjunction with the classifications from the white regulatory sign classifier and the turn restriction classifier to annotate it as a turn sign for multiple lanes.

In one scenario, the system may retain the history of all predicted sign types over a track (e.g., a given period of time along a particular section of roadway), in order to avoid one-frame misclassifications. This history can be used to get rid of most inconsistencies in the classification results.

Any remaining inconsistencies after considering the text/ symbol detector information and the history data can be resolved via a priority list for signage. By way of example, if both the stop sign and speed limit sign classification scores are above their respective thresholds, indicating that the sign could be both a stop sign and a speed limit sign, the system may select the stop sign as the proper classification because that type of sign has more critical behavioral implications for vehicle operation. In addition, if permanent signs are present, then once signs are added to the map (e.g., as updates to the roadgraph data) the system can use this information as a priori data. Here, for instance, the system could use such data to prefer predictions that are consistent with the map.

In one scenario, if separate detectors were employed, then every supported sign type could be published on the vehicle's internal communication bus (e.g., a Controller Area Network (CAN) bus or a FlexRay bus) by the respective detector as an object with its own type (e.g., a potential stop sign or a potential slow sign). However, because the pipelined approach discussed herein has one generic sign detector with multiple classifiers, the detector can publish sign-related objects, and each classifier has the ability to modify these objects by adding type information.

Thus, sign types can be treated as modifiable attributes. This will allow the system to avoid one-off misclassification mistakes, and keep richer history and information about sign type prediction, which for example can in turn allow us to correct a misclassification that happened at a first distance once the vehicle is closer to the sign and the perception system has a clearer view of it.

Upon performing any annotation, the system may then further evaluate and process the sign-related data. FIG. 8 illustrates one example 800. For instance, as shown and in accordance with the discussion of FIG. 5A, sensor information from block 802 is used in generic sign detection at block 804. The output from the generic sign detection is selectively provided to one or more of the classifiers, and to a text/symbol detection module, which are in block 806. The results from block 806 are then annotated with a (likely) sign type at block 808. Next, the system may perform sign localization at block 810 and/or sign-object association at block 812. While shown in series, these may be performed in parallel or in the opposite order. These operations may include revising or otherwise modifying the sign annotations.

Localization involves identifying where in the real world the sign is, since this may impact driving decisions made by the vehicle. This can include combining lidar inputs projected to the image views to understand where the sign is in the vehicle's surrounding environment. In particular, the system estimates the sign's position in the 3D world by estimating its coordinates in a global coordinate system. This can be done using a combination of approaches including the depth prediction from the sign detection stage and using elevation map data. Alternatively or additionally, this can also include using other prior knowledge about the sign type and the sizes it can exist in (e.g., a permanent stop sign may only have a few permissible physical sizes), and fusing context information from the roadgraph or other objects in the vehicle's environment. The localization information can be added to the existing information about the sign.

Sign-object association associates the sign with other objects in the environment. This includes associating signs with existing mapped signs, and for unmapped signs with other objects that hold them. For instance, if a sign is already in the map, the detected sign may be marked as a duplicate. If it is not a duplicate, the system can react to the new sign, including modifying a current driving operation, updating the onboard map and/or notifying a back-end service about the new sign. The sign-object association at block 812 can also associate the sign with other detections from other models. This can include a pedestrian detection model, where there may be a construction worker, police officer or a crossing guard holding a stop sign. It could also include a vehicle detection model, such as identifying whether another vehicle is a school bus, a construction vehicle, an emergency vehicle, etc.

By way of example, FIG. 9A illustrates a scene 900 where the system may detect a first barricade 902 and a ROAD CLOSED sign 904, and a second barricade 906 and a DO NOT ENTER sign 908. Here, the system may associate the ROAD CLOSED sign with the first barricade and the DO NOT ENTER sign with the second barricade. As this information may indicate that there is ongoing construction along the roadway, the vehicle's map may be updated accordingly and a notification may be sent to a back-end system, for instance so that other vehicles may be notified of the road closure.

FIG. 9B illustrates another scene 910, in which the system may detect a STOP sign 912 in the roadway and a construction sign 914 adjacent to the roadway. The construction sign may be determined to be a temporary sign due to its placement on the side of the road and/or due to the recognition of a set of legs extending from the base of the sign support. In this scene, the pedestrian detection model may identify a person 916 as a construction worker (e.g., due to a determination that the person is wearing a hard hat or a reflective vest). The system may recognize that the stop sign is adjacent to and being held by the construction worker. In this situation, the system may react to the stop sign by modifying the planned driving trajectory in order to come to a stop.

Figure 9C:
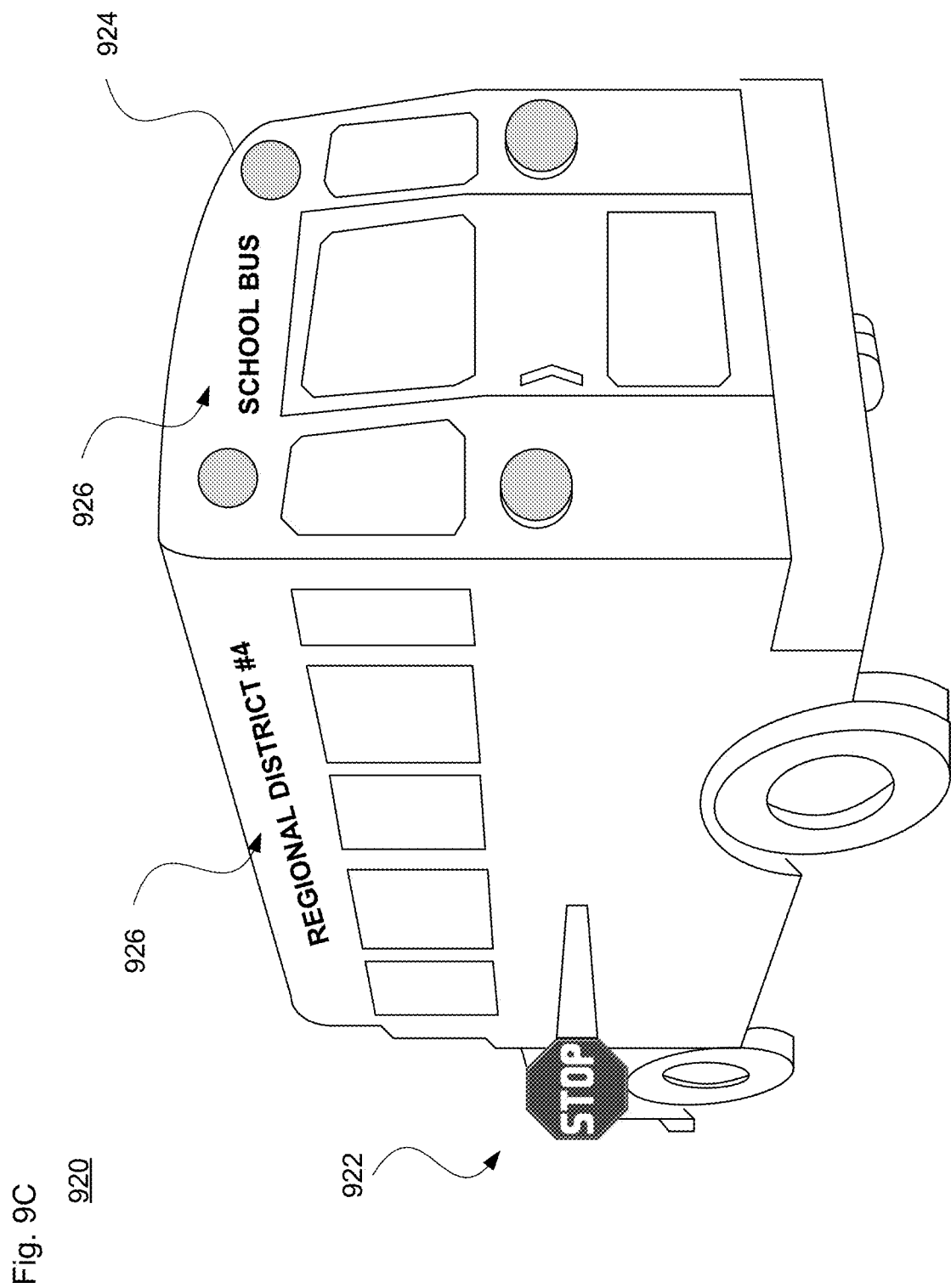

FIG. 9C illustrates yet another scene 920, in which the sign pipeline of the system detects stop sign 922 and a vehicle model determines that the adjacent vehicle 924 is a school bus. This may be done based on the overall shape of the vehicle, its color (e.g., yellow), text 926 (e.g., "SCHOOL BUS" or "REGIONAL DISTRICT #4") and/or other indicia along the vehicle (e.g., the presence of red or yellow flashing lights). Here, once the system determines the presence of a stop sign associated with a school bus, and that the sign is extended and not retracted, the planner/trajectory module may cause the vehicle to a stop.

There may be situations where a sign is detected but due to the association with another object, the system determines there is no need to react to the sign. For instance, FIG. 9D illustrates a scene 930 where there is a road with two lanes, 932L and 932R, and a vehicle 934 in the left lane 932L. Here, the sign pipeline system detects a set of signs 936 which have instructions for other vehicles to keep right. However, because the system associates the set of signs with the vehicle, which may include determining that the signs are loaded onto the rear of the vehicle, it may be determined (e.g., by the planner/trajectory module) that there is no need to move into the right lane 932R or otherwise alter the current trajectory.

Returning to FIG. 8, once annotation is complete and any subsequent processing including localization or object association has been performed with corresponding modifications to the annotations, the information about the detected signs is published by the system on the vehicle's internal communication bus. At this point, various onboard systems, such as the planner/trajectory module, may use the annotated sign information to make decisions related to autonomous driving.

Sign-related information, including the observed presence of a new sign not on a map, a sign that the pipeline was unable to classify, or an interesting feature of a sign (e.g., a non-standard color or shape), can be transmitted to a back-end system for evaluation or further processing. For instance, offboard processing may be performed for one or more of the classifiers. In one scenario, a back-end system may perform fleet management operations for multiple autonomous vehicles, and may be capable of real time direct communication with some or all of the autonomous vehicles in the fleet. The back-end system may have more processing resources available to it than individual vehicles. Thus, in some situations the back-end system may be able to quickly perform the processing for road sign evaluation in real time, and relay that information to the vehicle so that it may modify its planned driving (e.g., stopping) operations accordingly.

The back-end system may also use the received sign information to train new sign classifiers or to update existing sign classifiers, as well as to train the generic sign detector.

In some examples, machine learning models for sign classifiers, which may include neural networks, can be trained on sign information, map data and/or additional human labeled data. The training may be based on gathered real-world data (e.g., that is labeled according to road environment, intersection type, signage such as stop or yield signs, etc.). From this, one or more models may be developed and used in real-time evaluation by the autonomous vehicles, after the fact (e.g., post-processing) evaluation by the back-end system, or both. By way of example, the model structure may be a deep net, where the exact structure and parameters can be searched through automated machine learning, e.g., using a Neural Architecture Search (NAS) type model. Based on this, the onboard system (e.g., planner/trajectory module and/or navigation system of the vehicle's autonomous driving system) can utilize the model(s) in the parallel architecture approach discussed herein.

By way of example, a model may take the characteristics of a traffic sign and outputs a traffic sign type. The model may be for a specific type of sign, such that different models are used for different classifiers (e.g., sign classifiers 514-522 of FIG. 5A). As noted above, traffic sign types may include regulatory, warning, guide, services, recreation, construction, school zone, etc. In some instances, certain signs such as stop signs or railroad crossing signs may be considered sign types. In order to be able to use the model(s) to classify traffic sign types, the model(s) may first be trained "offline" that is, ahead of time and/or at a remote computing device and thereafter sent to the vehicle via a network or otherwise downloaded to the vehicle. One or more server computing devices may generate the model parameter values by first retrieving training data from a storage system.

For instance, the one or more server computing devices may retrieve a set of imagery. The imagery may include camera images corresponding to locations where traffic signs are likely to be visible, such as images that are a predetermined distance from and oriented towards known traffic signs. For instance, images captured by cameras or other sensors mounted on vehicles, such as vehicle 100, 120 or 150, where the cameras are within a certain distance of a traffic sign and are oriented towards the traffic sign may be retrieved and/or included in the set. The camera image may be processed and used to generate initial training data for the model. As noted above, the imagery may be associated with information identifying the location and orientation at which the image was captured.

Initial training data for the model may be generated from imagery in various ways. For instance, human operators may label images of traffic signs as well as the type of traffic sign by reviewing the images, drawing bounding boxes around traffic signs, and identifying the types of traffic signs. In addition or alternatively, existing models or image processing techniques may be used to label images of traffic signs as well as the type of traffic sign.

Given an image of a traffic sign, which may be considered a training input, and a label indicating the type of traffic sign, which may be considered a training output, the model for a given classifier may be trained to output the type of traffic sign found in a captured image. In other words, the training input and training output are used to train the model on what input it will be getting and what output it is to generate. As an example, the model may receive images containing signs, such as shown in the dashed boxes in FIG. 5B. The model may also receive labels indicating the type of sign each image shows including "regulatory sign", "construction sign", etc. In some instances, the type of sign may be specific, such as "no right turn sign" and "utility work ahead". Based on this training data, the model may learn to identify similar traffic signs. In this regard, the training may increase the precision of the model such that the more training data (input and output) used to train the model, the greater the precision of the model at identifying sign types.

In some instances, the model may be configured to provide additional labels indicative of the content of the sign. In this regard, during the training of the machine learning models, the training data may include labels corresponding to the attributes of the traffic signs. For instance, labels indicative of the attributes of a service sign including "rectangular shape," "blue color," and "text" stating "rest area next right", may be input into the machine learning model along with a label indicating the sign type as a service sign. As such, when the training model is run on an image of the service sign and the label, the model may learn that that the sign is a service sign indicating a rest area ahead. Based on this determination, the model may learn that other signs which include attributes such as a "rectangular shape," "blue color," and "text" stating "rest area next right" may also be service signs.

Once the model for a given classifier is trained, it may be sent or otherwise loaded into the memory of a computing system of an autonomous vehicle for use, such as memory of vehicle 100, 120 or 150. For example, as a vehicle drives around, that vehicle's perception system may capture sensor data of its surroundings. This sensor data, including any images including traffic signs, may be periodically, or continuously, sent to the back-end system to be used as input into the model. The model may then provide a corresponding sign type for each traffic sign in the images. For example, a vehicle may capture an image containing sign 550 and/or 552 as shown in FIG. 5B. The model may output a label indicating the sign type is a regulatory or construction sign. In some instances, the model may also provide the specific type of sign. For example, the model may output "warning sign" and "railroad crossing ahead" sign types. The provided sign type and attributes may then be used to determine how to control the vehicle in order to respond appropriately to the detected signs as described herein.

Labels annotated by humans comprise bounding boxes of where there are signs in an image, along with a sign type annotation (e.g., stop sign, yield sign, etc.), as well as attributes, including but not limited to color (e.g., red, green, orange, white, etc.), placement (handheld, permanent, temporary, school bus), content (text, figures, etc.), depth, etc. The detector is trained by feeding it full images with the bounding boxes and the attribute annotations. The detector will learn to predict bounding boxes as well as the extra attributes such as color and shape. To train a classifier, the detector is run to obtain detected signs. Those detections are joined with the labels. If a detected sign overlaps significantly with a given label, then the sign type of that label is assigned to it (e.g., stop sign). If the detected sign does not overlap significantly with that label, then the system deems it as not being a sign. The patch is then cropped around the detection, and so the system has image patches plus their labels as input to the training model. For a given classifier, the system only keeps the classes that that classifier predicts (e.g., all speed limits) and marks everything else as "unknown".

Figure 10A:
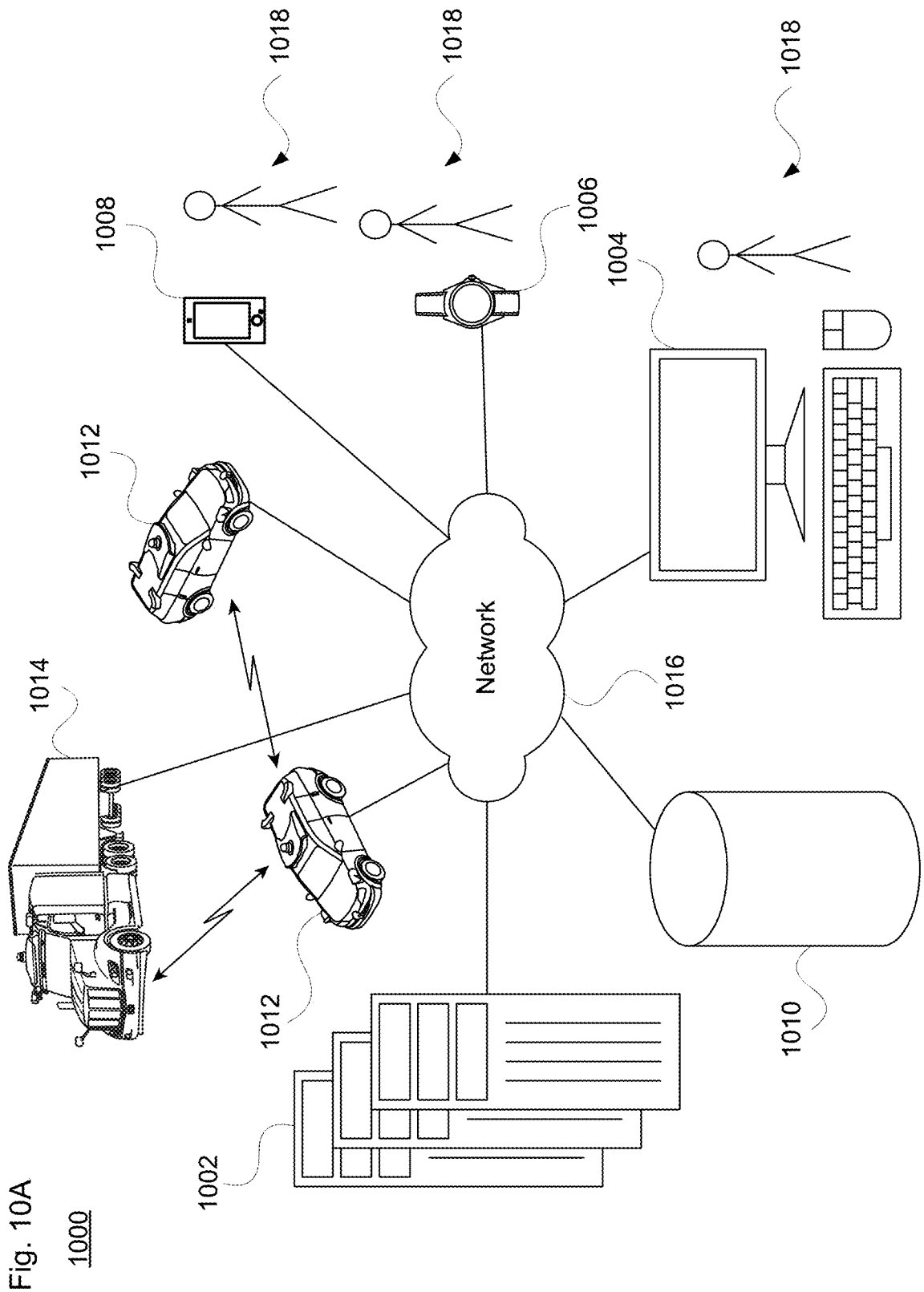
FIGS. 10A-B illustrate an example system in accordance with aspects of the technology.
Figure 10B:
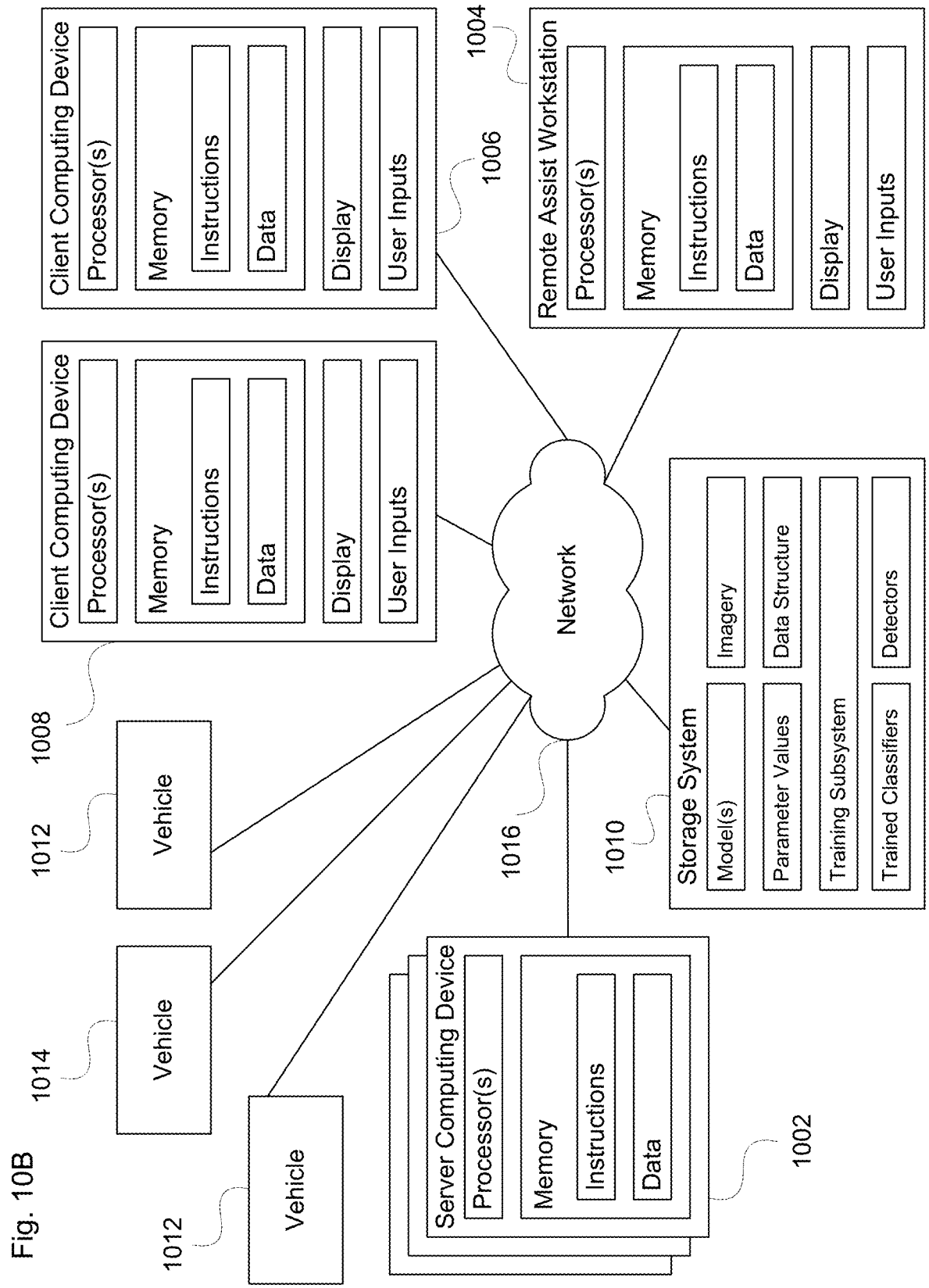

One example of a back-end system for fleet-type operation is shown in FIGS. 10A and 10B. In particular, FIGS. 10A and 10B are pictorial and functional diagrams, respectively, of an example system 1000 that includes a plurality of computing devices 1002, 1004, 1006, 1008 and a storage system 1010 connected via a network 1016. System 1000 also includes vehicles 1012 and 1014 configured to operate in an autonomous driving mode, which may be configured the same as or similarly to vehicles 100 and 150 of FIGS. 1A-B and 1C-D, respectively. Vehicles 1012 and/or vehicles 1014 may be parts of one or more fleets of vehicles that provide rides for passengers or deliver packages, groceries, cargo or other items to customers. Although only a few vehicles and computing devices are depicted for simplicity, a typical system may include significantly more.

As shown in FIG. 10B, each of computing devices 1002, 1004, 1006 and 1008 may include one or more processors, memory, data and instructions. Such processors, memories, data and instructions may be configured similarly to the ones described above with regard to FIG. 2 or 3A.

The various computing devices and vehicles may communicate directly or indirectly via one or more networks, such as network 1016. The network 1016, and intervening nodes, may include various configurations and protocols including short range communication protocols such as Bluetooth™, Bluetooth LE™, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, computing device 1002 may include one or more server computing devices having a plurality of computing devices, e.g., a load balanced server farm, that exchange information with different nodes of a network for the purpose of receiving, processing and transmitting the data to and from other computing devices. For instance, computing device 1002 may include one or more server computing devices that are capable of communicating with the computing devices of vehicles 1012 and/or 1014, as well as computing devices 1004, 1006 and 1008 via the network 1016. For example, vehicles 1012 and/or 1014 may be a part of a fleet of autonomous vehicles that can be dispatched by a server computing device to various locations. In this regard, the computing device 1002 may function as a dispatching server computing system which can be used to dispatch vehicles to different locations in order to pick up and drop off passengers or to pick up and deliver cargo or other items. In addition, server computing device 1002 may use network 1016 to transmit and present information to a user of one of the other computing devices or a passenger of a vehicle. In this regard, computing devices 1004, 1006 and 1008 may be considered client computing devices.

As shown in FIGS. 10A-B each client computing device 1004, 1006 and 1008 may be a personal computing device intended for use by a respective user 1018, and have all of the components normally used in connection with a personal computing device including a one or more processors (e.g., a central processing unit (CPU), graphics processing unit (GPU) and/or tensor processing unit (TPU)), memory (e.g., RAM and internal hard drives) storing data and instructions, a display (e.g., a monitor having a screen, a touch-screen, a projector, a television, or other device such as a smart watch display that is operable to display information), and user input devices (e.g., a mouse, keyboard, touchscreen or microphone). The client computing devices may also include a camera for recording video streams, speakers, a network interface device, and all of the components used for connecting these elements to one another.

Although the client computing devices may each comprise a full-sized personal computing device, they may alternatively comprise mobile computing devices capable of wirelessly exchanging data with a server over a network such as the Internet. By way of example only, client computing devices 1006 and 1008 may be mobile phones or devices such as a wireless-enabled PDA, a tablet PC, a wearable computing device (e.g., a smartwatch), or a netbook that is capable of obtaining information via the Internet or other networks.

In some examples, client computing device 1004 may be a remote assistance workstation used by an administrator or operator to communicate with riders of dispatched vehicles. Although only a single remote assistance workstation 1004 is shown in FIGS. 10A-B, any number of such workstations may be included in a given system. Moreover, although operations workstation is depicted as a desktop-type computer, operations workstations may include various types of personal computing devices such as laptops, netbooks, tablet computers, etc. By way of example, the remote assistance workstation may be used by a technician or other user to help process sign-related, including labeling of different types of signs.

Storage system 1010 can be of any type of computerized storage capable of storing information accessible by the server computing devices 1002, such as a hard-drive, memory card, ROM, RAM, DVD, CD-ROM, flash drive and/or tape drive. In addition, storage system 1010 may include a distributed storage system where data is stored on a plurality of different storage devices which may be physically located at the same or different geographic locations. Storage system 1010 may be connected to the computing devices via the network 1016 as shown in FIGS. 10A-B, and/or may be directly connected to or incorporated into any of the computing devices.

Storage system 1010 may store various types of information. For instance, the storage system 1010 may store autonomous vehicle control software which is to be used by vehicles, such as vehicles 1012 or 1014, to operate such vehicles in an autonomous driving mode. Storage system 1010 may also store one or more models and data for training the models such as imagery, parameter values for the model, a data structure of, e.g., labeled sign attributes. The storage system 1010 may also store a training subsystem to train the model(s), as well as resultant information such as trained classifiers, the generic sign detector, and the text and symbol detector. The trained classifiers and detectors may be shared with specific vehicles or across the fleet as needed. They may be updated in real time, periodically, or off-line as additional sign-related information is obtained. The storage system 1010 can also include route information, weather information, etc. This information may be shared with the vehicles 1012 and 1014, for instance to help with operating the vehicles in an autonomous driving mode.

Figure 11:
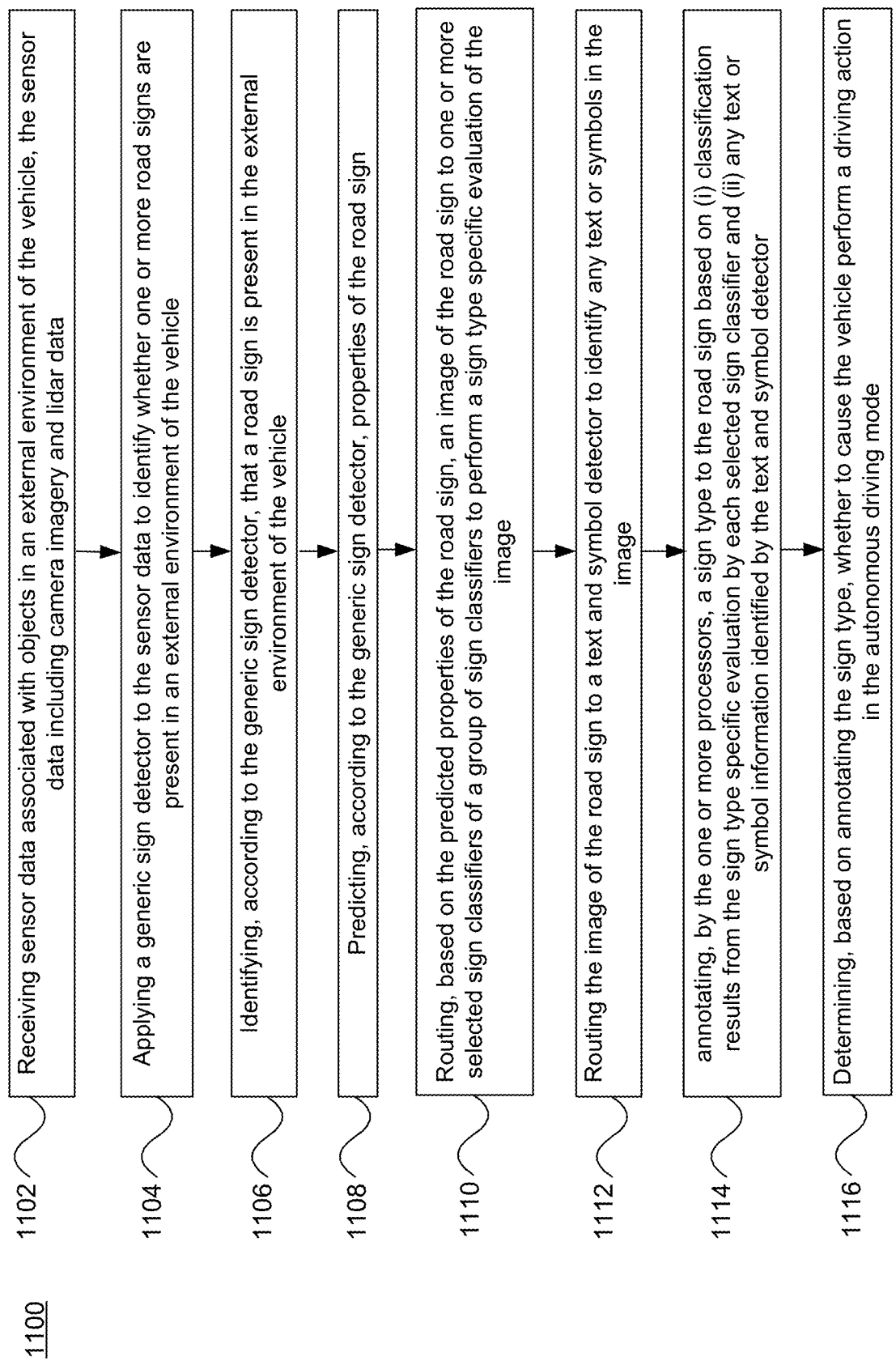
FIG. 11 illustrates an example method in accordance with aspects of the technology.

FIG. 11 illustrates a flow diagram 1100 according to one aspect of the technology, which provides a method of controlling a vehicle operating in an autonomous driving mode. At block 1102, the method includes receiving, by one or more sensors of a perception system of the vehicle, sensor data associated with objects in an external environment of the vehicle, the sensor data including camera imagery and lidar data. At block 1104, one or more processors of a computing system of the vehicle apply a generic sign detector to the sensor data to identify whether one or more road signs are present in an external environment of the vehicle. At block 1106, the method includes identifying, by the one or more processors according to the generic sign detector, that a road sign is present in the external environment of the vehicle. At block 1108, properties of the road sign are predicted according to the generic sign detector. At block 1110, the method includes routing, based on the predicted properties of the road sign, an image of the road sign to one or more selected sign classifiers of a group of sign classifiers to perform a sign type specific evaluation of the image. At block 1112, the image of the road sign is also routed to a text and symbol detector to identify any text or symbols in the image. At block 1114, the method includes annotating a sign type to the road sign based on (i) classification results from the sign type specific evaluation by each selected sign classifier and (ii) any text or symbol information identified by the text and symbol detector. And at block 1116, the method includes determining, based on annotating the sign type, whether to cause the vehicle perform a driving action in the autonomous driving mode.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

The invention claimed is:

1. A method comprising:
   receiving, by one or more sensors of a perception system of a vehicle, sensor data associated with a road sign in an external environment of the vehicle;
   generating, by one or more processors of a computing system of the vehicle using each of a plurality of sign classifiers, a corresponding prediction value associated with the road sign;
   identifying, by the one or more processors, text or symbol information in an image of the road sign using a text or symbol detector; and
   determining, by the one or more processors, a sign type of the road sign based on (i) the corresponding prediction value for each sign classifier and (ii) the text or symbol information.

2. The method of claim 1, further comprising identifying presence of the road sign using a generic sign detector prior to the generating and the identifying.

3. The method of claim 1, wherein the sensor data includes camera imagery and lidar data.

4. The method of claim 3, wherein the lidar data includes at least one of depth information, intensity information, or height information.

5. The method of claim 1, further comprising annotating the sign type.

6. The method of claim 5, further comprising performing a sign localization operation upon annotating the sign type.

7. The method of claim 6, wherein the sign localization operation is based on at least one of (i) estimating 3D coordinates of the road sign in the external environment, or (ii) using prior knowledge of the sign type and possible sign sizes.

8. The method of claim 1, further comprising performing a sign-object association operation.

9. The method of claim 1, wherein the plurality of sign classifiers includes one or more selected from the group consisting of a stop sign classifier, a speed limit sign classifier, a sign color classifier, or a regulatory sign classifier.

10. The method of claim 1, further comprising predicting one or more properties of the road sign include at least one of color, shape, placement, depth, or heading.

11. The method of claim 10, wherein the placement is either handheld, temporary or permanent.

12. The method of claim 1, wherein each of the plurality of sign classifiers outputs either a specific sign type or an indication of an unknown type.

13. The method of claim 1, wherein each sign classifier is separately trained based on selected imagery to identify a respective sign type.

14. A vehicle comprising:
   a perception system including one or more sensors, the one or more sensors being configured to receive sensor data associated with objects in an external environment of the vehicle;
   a driving system including a steering subsystem, an acceleration subsystem and a deceleration subsystem to control driving of the vehicle in an autonomous driving mode;
   a positioning system configured to determine a current position of the vehicle; and
   a control system including one or more processors, the control system operatively coupled to the driving system, the perception system and the positioning system, the control system being configured to:
      receive, from the one or more sensors of the perception system, the sensor data associated with a road sign in the external environment of the vehicle;
      generate, using each of a plurality of sign classifiers, a corresponding prediction value associated with the road sign;
      identify, using a text or symbol detector, text or symbol information in an image of the road sign; and
      determine a sign type of the road sign based on (i) the corresponding prediction value for each sign classifier and (ii) the text or symbol information.

15. The vehicle of claim 14, wherein the control system is further configured to perform a sign localization operation according to an annotation of the sign type.

16. The vehicle of claim 14, wherein the control system is further configured to perform a sign-object association operation.

17. The vehicle of claim 14, wherein the control system is further configured to crop a region around the image of the road sign.

18. The vehicle of claim 14, wherein each sign classifier outputs either a specific sign type or an indication of an unknown type.

19. The vehicle of claim 14, wherein the control system is further configured to identify presence of the road sign using a generic sign detector.

20. The vehicle of claim 14, wherein the sensor data includes lidar data that comprises at least one of depth information, intensity information, or height information.

21. The vehicle of claim 14, wherein the control system is further configured to manage operation of the driving system based on determination of the sign type.

* * * * *